US011820323B2

(12) United States Patent
Sakai et al.

(10) Patent No.: US 11,820,323 B2
(45) Date of Patent: Nov. 21, 2023

(54) VEHICLE CONTROL SYSTEM, VEHICLE CONTROL METHOD, AND NON-TRANSITORY COMPUTER-READABLE STORAGE MEDIUM STORING VEHICLE CONTROL PROGRAM

(71) Applicant: HONDA MOTOR CO., LTD., Tokyo (JP)

(72) Inventors: Masakatsu Sakai, Wako (JP); Naoto Yamamoto, Wako (JP); Hiroyuki Shibasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 309 days.

(21) Appl. No.: 17/196,501

(22) Filed: Mar. 9, 2021

(65) Prior Publication Data
US 2021/0291783 A1 Sep. 23, 2021

(30) Foreign Application Priority Data

Mar. 18, 2020 (JP) ................................ 2020-048167

(51) Int. Cl.
| | |
|---|---|
| *B60R 25/04* | (2013.01) |
| *B60Q 9/00* | (2006.01) |
| *B60R 25/10* | (2013.01) |
| *B60R 16/023* | (2006.01) |

(52) U.S. Cl.
CPC ............... *B60R 25/04* (2013.01); *B60Q 9/00* (2013.01); *B60R 16/0232* (2013.01); *B60R 25/10* (2013.01); *B60R 2025/041* (2013.01)

(58) Field of Classification Search
CPC ..... B60R 25/04; B60R 16/0232; B60R 25/10; B60R 2025/041; B60R 25/045; B60Q 9/00; G06Q 30/0645; G06Q 50/30
See application file for complete search history.

(56) References Cited

U.S. PATENT DOCUMENTS

| | | | |
|---|---|---|---|
| 2002/0013815 A1* | 1/2002 | Obradovich | ............ H04L 51/42 715/744 |
| 2012/0078535 A1* | 3/2012 | Nakamura | .......... F02D 41/1441 702/35 |
| 2013/0001293 A1* | 1/2013 | Sanchez | .................. B60L 53/00 235/375 |

(Continued)

FOREIGN PATENT DOCUMENTS

| | | |
|---|---|---|
| CN | 110576742 A | 12/2019 |
| JP | 2002-59812 A | 2/2002 |

(Continued)

OTHER PUBLICATIONS

Japanese Office Action with English translation dated Apr. 5, 2022, 9 pages.

(Continued)

*Primary Examiner* — George C Jin
(74) *Attorney, Agent, or Firm* — Rankin, Hill & Clark LLP

(57) ABSTRACT

A vehicle control system includes: a vehicle start control unit that when a predetermined start prohibition condition for the vehicle is established, prohibits the vehicle from starting; and a notice control unit that before the vehicle is prohibited from starting by the vehicle start control unit, provides a first advance notice that is an advance notice of prohibiting the vehicle from starting, into a cabin of the vehicle.

9 Claims, 13 Drawing Sheets

(56) References Cited

U.S. PATENT DOCUMENTS

| | | | |
|---|---|---|---|
| 2014/0279397 A1* | 9/2014 | Schmidt | G06Q 40/03 |
| | | | 705/38 |
| 2019/0193679 A1* | 6/2019 | Mueller | B60R 25/22 |
| 2019/0375371 A1 | 12/2019 | Terayama | |
| 2020/0087954 A1* | 3/2020 | Sy | B60R 25/24 |
| 2020/0273153 A1* | 8/2020 | Hiramaki | H04N 7/183 |
| 2021/0024035 A1* | 1/2021 | Nakashima | B60R 25/2018 |
| 2021/0237683 A1* | 8/2021 | Nakashima | B60R 25/31 |
| 2022/0134999 A1* | 5/2022 | Nakashima | G07F 17/0057 |
| | | | 701/2 |

FOREIGN PATENT DOCUMENTS

| | | |
|---|---|---|
| JP | 2004-511839 A | 4/2004 |
| JP | 2004-227513 A | 8/2004 |
| JP | 6238038 B | 11/2017 |
| WO | 2016/167350 A1 | 10/2016 |

OTHER PUBLICATIONS

Japanese Office Action with English translation dated Dec. 7, 2021, 8 pages.
Chinese Office Action, Application No. CN 202110268080.9, dated Feb. 9, 2023, 9 pages.

* cited by examiner

FIG.7
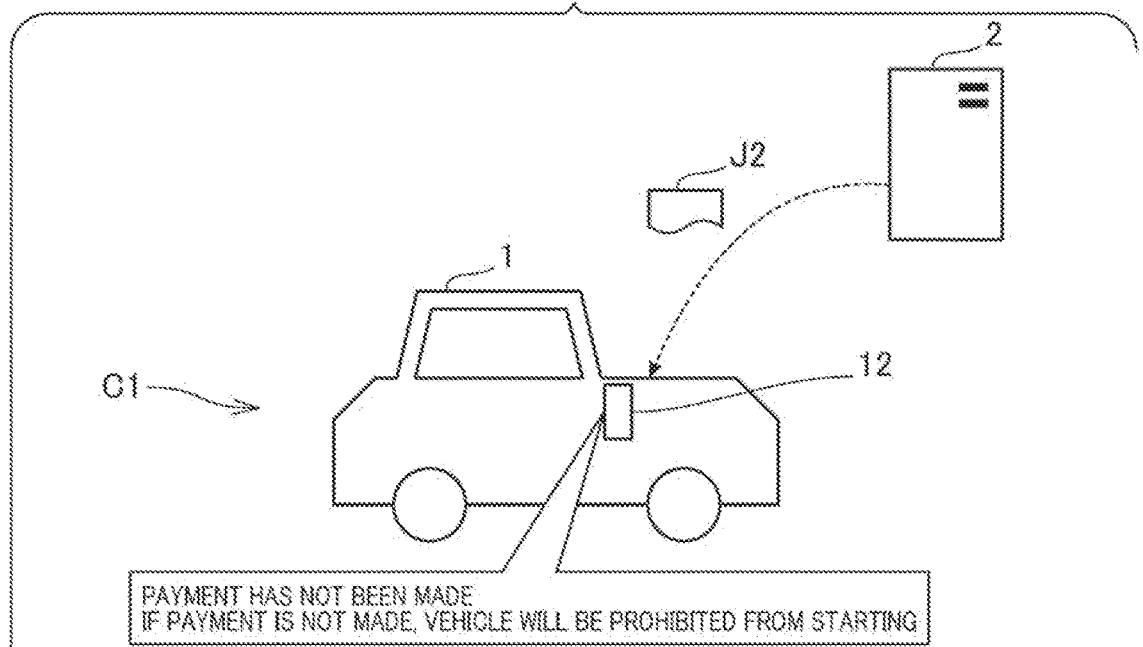
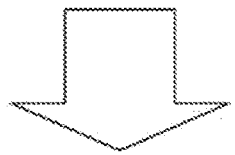
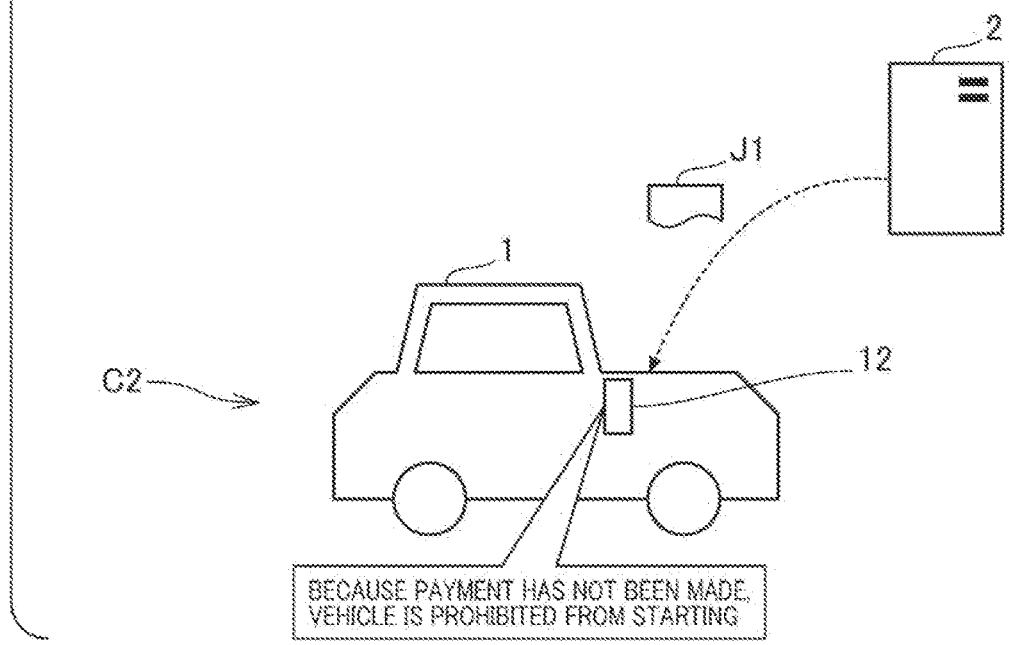

VEHICLE CONTROL SYSTEM, VEHICLE CONTROL METHOD, AND NON-TRANSITORY COMPUTER-READABLE STORAGE MEDIUM STORING VEHICLE CONTROL PROGRAM

INCORPORATION BY REFERENCE

The present application claims priority under 35 U.S.C. § 119 to Japanese Patent Application No. 2020-048167 filed on Mar. 18, 2020. The content of the application is incorporated herein by reference in its entirety.

BACKGROUND OF THE INVENTION

Field of the Invention

The present invention relates to a vehicle control system, a vehicle control method, and a non-transitory computer-readable storage medium storing a vehicle control program.

Description of the Related Art

A technique for prohibiting the start of a vehicle has conventionally been known. For example, Japanese Patent Laid-Open No. 2002-59812 discloses a system in which when a security center receives a message that a vehicle has been stolen, the security center transmits theft information to the vehicle which has been stolen and the vehicle having received the theft information prohibits the restart of its engine.

SUMMARY OF THE INVENTION

A situation in which the start of a vehicle is prohibited as described in Japanese Patent Laid-Open No. 2002-59812 includes the above-mentioned case where the vehicle has been stolen and in addition, includes a case, for example, where although the use of a vehicle by a user has been permitted under an usage contract, the user has not conformed to contract conditions of the usage contract. In a configuration described in Japanese Patent Laid-Open No. 2002-59812, the vehicle is immediately prohibited from starting on receipt of information for prohibiting the start even in such a case; and therefore, prohibition of the start of the vehicle may be performed unexpectedly to the user of the vehicle.

Therefore, it is an object of the present invention to reduce the possibility of causing the start of the vehicle to be prohibited unexpectedly to a user of the vehicle.

One aspect to achieve the above object is a vehicle control system that includes: a vehicle start control unit that when a predetermined start prohibition condition for a vehicle is established, prohibits the vehicle from starting; and a notice control unit that before the vehicle is prohibited from starting by the vehicle start control unit, provides a first advance notice that is an advance notice of prohibiting the vehicle from starting, into a cabin of the vehicle.

The above vehicle control system may be configured so that the vehicle is used by a user under a predetermined usage contract and the start prohibition condition is user's failure to fulfill the usage contract.

The above vehicle control system may include a power state detection unit which detects whether power of the vehicle is on or off; and be configured so that the notice control unit provides the first advance notice when the power state detection unit detects that the power of the vehicle is on and does not provide the first advance notice when the power state detection unit detects that the power of the vehicle is off.

The above vehicle control system may be configured so that: the notice control unit provides the first advance notice when receiving, from a server, advance notice information instructing to provide an advance notice of prohibiting the vehicle from starting; and may include a transmission control unit which transmits, when the power state detection unit detects that the power of the vehicle has turned from off to on, inquiry information for inquiring whether the advance notice information is to be retransmitted, to the server.

The above vehicle control system may include a battery state detection unit which detects whether a battery state of the vehicle is a normal state or an abnormal state; and be configured so that the notice control unit provides the first advance notice when receiving, from the server, advance notice information instructing to provide an advance notice of prohibiting the vehicle from starting; and may include a transmission control unit which transmits, when the battery state detection unit detects that the battery state has transitioned from a normal state to an abnormal state, inquiry information for inquiring whether the advance notice information is to be retransmitted, to the server.

The above vehicle control system may include a determination unit which determines whether the vehicle has traveled after the notice control unit has provided the first advance notice; and be configured so that the notice control unit provides into the cabin of the vehicle a second advance notice that is an advance notice of prohibiting the vehicle from starting and is different in a notice mode from a notice mode of the first advance notice, according to a result of the determination by the determination unit.

The above vehicle control system may be configured so that the notice control unit provides the second advance notice when the determination unit determines that the vehicle has traveled.

The above vehicle control system may include a timing change unit which changes a timing at which the vehicle start control unit prohibits the vehicle from starting after the notice control unit has provided the second advance notice, to a timing that is earlier than a timing determined when the notice control unit has provided the first advance notice.

The above vehicle control system may include a power state detection unit which detects whether the power of the vehicle is on or off; and be configured so that the notice control unit provides the second advance notice even when the power state detection unit detects that the power of the vehicle is off.

Another aspect to achieve the above object is to provide a vehicle control method that is executed by a computer, the method including: a vehicle start control step of prohibiting a vehicle from starting when a predetermined start prohibition condition for the vehicle is established; and a notice control step of providing, into a cabin of the vehicle, a first advance notice that is an advance notice of prohibiting the vehicle from starting before the vehicle is prohibited from starting by the vehicle start control step.

Yet another aspect to achieve the above object is to provide a non-transitory computer-readable storage medium storing a vehicle control program that causes a computer to function as: a vehicle start control unit that prohibits, when a predetermined start prohibition condition for a vehicle is established, the vehicle from starting; and a notice control unit that provides, into a cabin of the vehicle, a first advance notice that is an advance notice of prohibiting the vehicle from starting before the vehicle is prohibited from starting by the vehicle start control unit.

One aspect of the present invention can reduce the possibility of causing the start of a vehicle to be prohibited unexpectedly to a user of the vehicle.

BRIEF DESCRIPTION OF THE DRAWINGS

FIG. 7 is a diagram for specifically describing an operation of the vehicle control system;

DETAILED DESCRIPTION OF THE PREFERRED EMBODIMENTS

First Embodiment

First, a first embodiment will be described.

Figure 1:
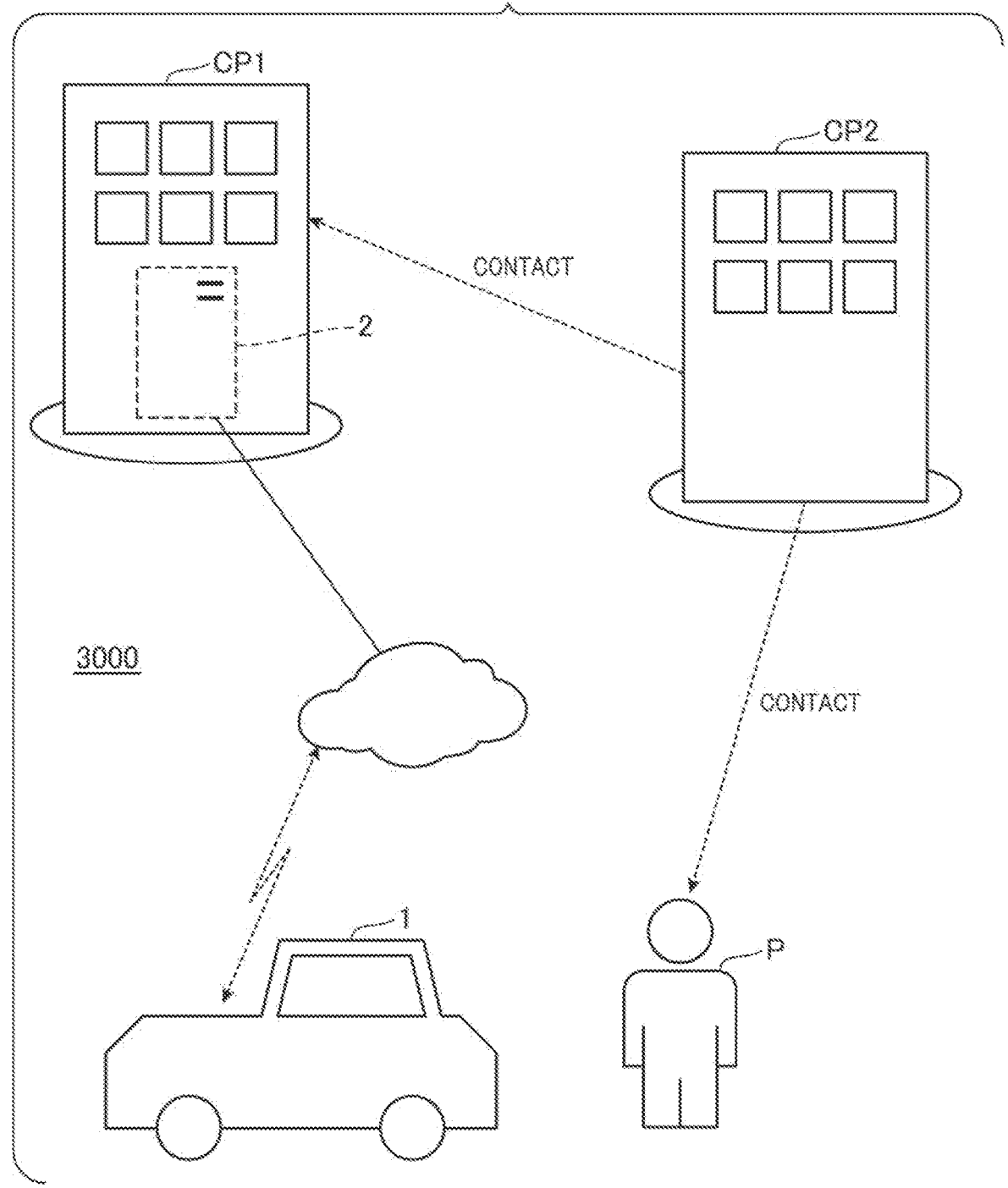
FIG. 1 is a diagram showing a configuration of a vehicle control system.

FIG. 1 is a diagram showing a configuration of a vehicle control system 3000.

The vehicle control system 3000 includes a vehicle 1 and a vehicle control server 2 that is communicable with the vehicle 1 via a network NW. The vehicle control server 2 corresponds to a server according to the present invention. The network NW includes the Internet, telephone networks, and other communication networks.

The vehicle 1 is a four-wheel passenger car purchased by an owner P of the vehicle 1 with a loan. In other words, the owner P of the vehicle 1 has concluded a loan contract for the purchase of the vehicle 1 with a loan company CP2. The loan contract corresponds to a usage contract in the present invention.

The vehicle control server 2 is a server device owned by a vehicle management company CP1 that manages the vehicle 1 which has been purchased with a loan. Although, in each figure, the vehicle control server 2 is represented as one block, this does not necessarily mean that the vehicle control server 2 is configured by a single server device. For example, the vehicle control server 2 may be configured so as to include a plurality of server devices each of which performs different processing.

For example, when being contacted from the loan company CP2 about the owner P who has not made a monthly loan payment, the vehicle management company CP1 controls the operation of the vehicle 1 purchased by the owner P, through the vehicle control server 2. A failure to make a loan payment corresponds to a failure to fulfill the usage contract in the present invention.

The loan company CP2 contacts the vehicle management company CP1 about the owner P who has not made a monthly loan payment, for example. Contents about which the loan company CP2 contacts the vehicle management company CP1 include the name of the owner P who has not made a monthly payment and the ID of a loan contractor, for example. In addition, the loan company CP2 contacts the owner P who has not made a monthly loan payment about having not made the loan payment, by telephone or mail, for example.

In this embodiment, the vehicle management company CP1 and the loan company CP2 are separate companies which perform business collaboration. However, this is one example and the vehicle management company CP1 may conduct business related to the loan taken out by the owner P in addition to the business of managing the vehicle 1 purchased with a loan. Furthermore, the loan company CP2 may conduct business of managing the vehicle 1 purchased with a loan in addition to the business related to the loan taken out by the owner P of the vehicle 1. In the latter case, the vehicle control server 2 is owned by the loan company CP2.

Next, the vehicle 1 and the vehicle control server 2 that constitute the vehicle control system 3000 will be described.

Figure 2:
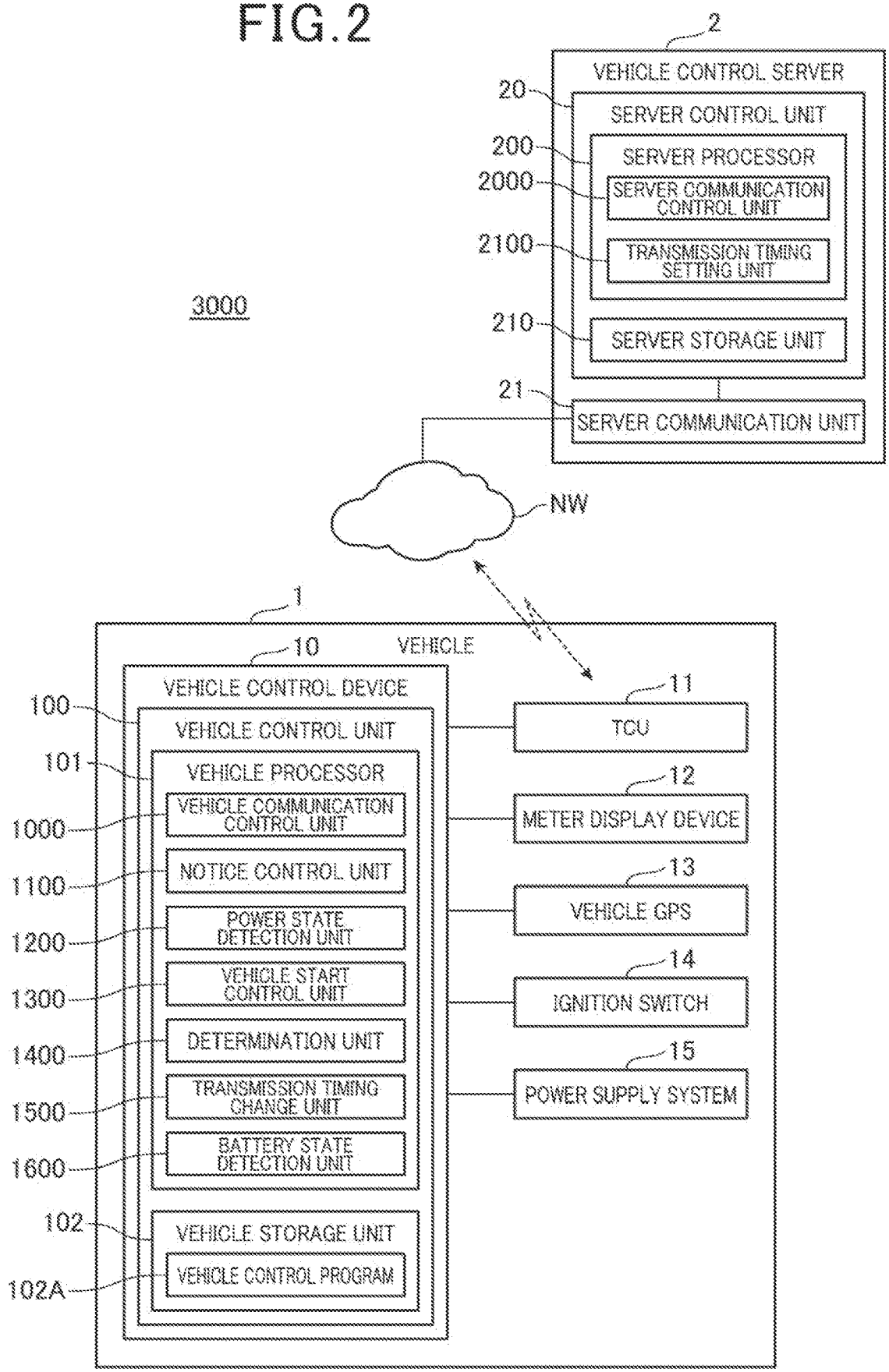
FIG. 2 is a diagram showing configurations of a vehicle control server and a vehicle.

FIG. 2 is a diagram showing configurations of the vehicle 1 and the vehicle control server 2.

First, the configuration of the vehicle control server 2 will be described.

The vehicle control server 2 includes a server control unit 20 and a server communication unit 21 (transmitter/receiver).

The server control unit 20, which includes a server processor 200 that is a processor executing a program, such as a CPU or an MPU, and a server storage unit 210, and controls each unit of the vehicle control server 2. The vehicle control server 2 executes various kinds of processing by cooperation between hardware and software so that the server processor 200 reads a control program stored in the server storage unit 210 and executes processing. The server processor 200 reads and executes the control program stored in the server storage unit 210, thereby functioning as a server communication control unit 2000 and a transmission timing setting unit 2100.

The server storage unit 210 has a storage area in which programs to be executed by the server processor 200 and data to be processed by the server processor 200 are stored. The server storage unit 210 stores the control program to be executed by the server processor 200 and other various kinds of data. The server storage unit 210 has a nonvolatile storage area in which programs and data are stored in a non-volatile manner. In addition, the server storage unit 210 may include a volatile storage area, and a work area for temporarily storing a program to be executed and data to be processed by the server processor 200 may be formed in the volatile storage area.

The server communication unit 21 is configured by communication hardware conforming to a predetermined communication standard and communicates with the vehicle 1 via the network NW in accordance with control of the server control unit 20.

As described above, the server control unit 20 functions as the server communication control unit 2000 and the transmission timing setting unit 2100.

The server communication control unit 2000 controls the server communication unit 21 to transmit and receive various kinds of information to and from the vehicle 1 through the network NW. The server communication control unit 2000 transmits start prohibition information J1 instructing to prohibit the start of the vehicle 1, to the vehicle 1 via the network NW at a timing which is set by the transmission timing setting unit 2100. In addition, the server communication control unit 2000 transmits advance notice information J2 instructing to provide an advance notice of prohibiting the start of the vehicle 1, to the vehicle 1 via the network NW. Furthermore, the server communication control unit 2000 receives change request information from the vehicle 1. When receiving the change request information from the vehicle 1, the server communication control unit 2000 outputs the change request information to the transmission timing setting unit 2100. The change request information will be described later.

The transmission timing setting unit 2100 sets a timing at which the server communication control unit 2000 transmits the start prohibition information J1. In the description below, the timing for transmitting the start prohibition information J1 will be expressed as "transmission timing." Since the transmission of the start prohibition information J1 causes the start of the vehicle 1 to be prohibited, the transmission timing corresponds to a timing at which the vehicle 1 is prohibited from starting. When the server communication control unit 2000 transmits the advance notice information J2, the transmission timing setting unit 2100 sets the transmission timing to a timing after a predetermined time period (for example, one week) has passed after the timing at which the advance notice information J2 has been transmitted. In addition, when the change request information is transmitted from the server communication control unit 2000, the transmission timing setting unit 2100 sets the transmission timing to a timing that is earlier than the timing determined when the advance notice information J2 has been transmitted. When the advance notice information J2 is transmitted, a first advance notice, which will be described later, is provided in the cabin of the vehicle 1 and therefore, the timing determined when the advance notice information J2 has been transmitted corresponds to a timing determined when the first advance notice is provided.

Next, the configuration of the vehicle 1 will be described. The vehicle 1 includes: a vehicle control device 10, a telematics control unit (TCU) 11, a meter display device 12, a vehicle GPS 13, an ignition switch 14, and a power supply system 15.

The vehicle control device 10 includes a vehicle control unit 100. The vehicle control unit 100 corresponds to a computer according to the present invention. The vehicle control unit 100, which includes a vehicle processor 101 that is a processor executing a program, such as a CPU or an MPU, and a vehicle storage unit 102 (non-transitory computer-readable storage medium, memory), and controls each unit of the vehicle control device 10. The vehicle processor 101 reads and executes a vehicle control program 102A stored in the vehicle storage unit 102, thereby functioning as a vehicle communication control unit 1000, a notice control unit 1100, a power state detection unit 1200, a vehicle start control unit 1300, a determination unit 1400, a transmission timing change unit 1500, and a battery state detection unit 1600.

The vehicle communication control unit 1000 corresponds to a transmission control unit according to the present invention. The transmission timing change unit 1500 corresponds to a timing change unit according to the present invention.

The vehicle storage unit 102 has a storage area in which a program executed by the vehicle processor 101 and data processed by the vehicle processor 101 are stored. The vehicle storage unit 102 stores a vehicle control program 102A executed by the vehicle processor 101, and other various kinds of data. The vehicle storage unit 102 has a nonvolatile storage area in which programs and data are stored in a non-volatile manner. In addition, the vehicle storage unit 102 may include a volatile storage area, where a work area for temporarily storing a program to be executed and data to be processed by the vehicle processor 101 may be formed.

The meter display device 12 includes a display, which displays various kinds of information for passengers of the vehicle 1. The meter display device 12 is arranged at a position visible to at least a driver of the vehicle 1. The display of the meter display device 12 displays the traveling speed of the vehicle 1, the rotation speed of an engine, functions of the vehicle 1 and the engine, and the like, as information.

The vehicle GPS 13 is a processing unit that receives a GPS signal from a GPS satellite through an antenna, which is not illustrated, and calculates the position of the vehicle 1 based on the received GPS signal. The vehicle GPS 13 generates position data indicating the position of the vehicle 1 and outputs the position data to the vehicle control device 10.

The ignition switch 14 is a switch that receives the start operation and stop operation of the vehicle 1 and turns the ignition power on or off.

The power supply system 15 is configured to supply each unit of the vehicle 1 with power which is supplied from a battery mounted on the vehicle 1. The power supply system 15 supplies each unit of the vehicle 1 with power in accordance with control of the vehicle control device 10.

As described above, the vehicle processor 101 functions as the vehicle communication control unit 1000, the notice control unit 1100, the power state detection unit 1200, the vehicle start control unit 1300, the determination unit 1400, and the transmission timing change unit 1500.

The vehicle communication control unit 1000 transmits and receives various kinds of information to and from the vehicle control server 2 via the network NW by the TCU 11. The vehicle communication control unit 1000 receives the advance notice information J2 from the vehicle control server 2 by the TCU 11. The vehicle communication control unit 1000 outputs the received advance notice information J2 to the notice control unit 1100. The vehicle communication control unit 1000 receives the start prohibition information J1 from the vehicle control server 2 by the TCU 11. The vehicle communication control unit 1000 stores the received start prohibition information J1 in the vehicle storage unit 102.

When obtaining the advance notice information J2 from the vehicle communication control unit 1000, the notice control unit 1100 provides an advance notice of prohibiting the vehicle 1 from starting into the cabin of the vehicle 1. In providing the advance notice of prohibiting the vehicle 1 from starting, the notice control unit 1100 provides either of a first advance notice or a second advance notice each having a different notice mode, according to the use state of the vehicle 1.

In the present embodiment, the first advance notice is a notice provided only by information display of the meter display device 12. For example, the vehicle communication control unit 1000 makes the meter display device 12 display information, such as "Payment has not been done. The vehicle will be prohibited from starting if payment is not done." in the first advance notice.

In the present embodiment, the second advance notice is a notice provided in a notice mode in which other notice modes such as enlarging of an information display area and regular alerting are added to the notice mode of the first advance notice. Therefore, the second advance notice gives a stronger stimulus to the user of the vehicle 1. Note that the user of the vehicle 1 may be the owner P of the vehicle 1 who is a loan contractor, or may be a person who has been permitted to use the vehicle 1 by the owner P1.

When the start prohibition information J1 is stored in the vehicle storage unit 102, the notice control unit 1100 provides a notice indicating that the vehicle 1 is prohibited from starting, into the cabin of the vehicle 1. For example, the notice control unit 1100 makes the meter display device 12 display information, such as "Payment has not been done and the vehicle has been prohibited from starting."

The power state detection unit 1200 detects on or off of the ignition power based on a state of the ignition switch 14. The power state detection unit 1200 outputs a result of the detection to the notice control unit 1100 and the vehicle start control unit 1300.

When the result of the detection by the power state detection unit 1200 indicates that the ignition power is on, the vehicle start control unit 1300 makes the power supply system 15 start power supply to a drive motor and the like of the vehicle 1. Thus, the vehicle start control unit 1300 allows the start of the vehicle 1. In addition, when a predetermined start prohibition condition is established, a result of the detection by the power state detection unit 1200 indicates that the ignition power is off and therefore, the vehicle start control unit 1300 does not make the power supply system 15 start power supply to the drive motor and the like of the vehicle 1. In other words, the vehicle start control unit 1300 prohibits the vehicle 1 from starting when the predetermined start prohibition condition is established. More specifically, if the start prohibition information J1 is stored in the vehicle storage unit 102, that is, if the vehicle 1 receives the start prohibition information J1 from the vehicle control server 2, the result of the detection by the power state detection unit 1200 indicates that the ignition power is off and therefore, the vehicle start control unit 1300 prohibits the vehicle 1 from starting. If the owner P of the vehicle 1 has not made a loan payment, the vehicle control server 2 transmits the start prohibition information J1 to the vehicle 1 and therefore, establishment of the predetermined start prohibition condition can be said in other words as the owner P of the vehicle 1 having not made a loan payment.

The determination unit 1400 determines whether the vehicle 1 has traveled after the vehicle communication control unit 1000 has received the advance notice information J2 by the TCU 11. More specifically, the determination unit 1400 determines whether the vehicle 1 has traveled after the notice control unit 1100 has provided the first advance notice. The determination unit 1400 obtains the position of the vehicle 1 at a time when the vehicle communication control unit 1000 receives the advance notice information J2, from the vehicle GPS 13. In addition, the determination unit 1400 obtains, from the vehicle GPS 13, the position of the vehicle 1 after a predetermined time has passed since it has obtained the position of the vehicle 1 at a time when the vehicle communication control unit 1000 has received the advance notice information J2. Then, if there is a difference between the positions of the vehicle 1 which are obtained before and after the elapse of the predetermined time, the determination unit 1400 determines that the vehicle 1 has traveled after the vehicle 1 has received the advance notice information J2. In addition, if there is no difference between the positions of the vehicle 1 which are obtained before and after the elapse of the predetermined time, the determination unit 1400 determines that the vehicle 1 has not traveled after the vehicle 1 has received the advance notice information J2. The determination unit 1400 outputs a determination result to the notice control unit 1100 and the transmission timing change unit 1500.

The transmission timing change unit 1500 changes the transmission timing by transmitting change request information that requests a change of the transmission timing to the vehicle control server 2 by the TCU 11. More specifically, the transmission timing change unit 1500 changes a timing at which the vehicle start control unit 1300 prohibits the vehicle 1 from starting, by transmitting the change request information to the vehicle control server 2. If the determination result of the determination unit 1400 indicates that the vehicle 1 has traveled, the transmission timing change unit 1500 generates change request information that requests a change of the transmission timing to an earlier timing than the timing which has been set when the advance notice information J2 has been transmitted. Then, the transmission timing change unit 1500 outputs the generated change request information to the vehicle communication control unit 1000. The vehicle communication control unit 1000 transmits the output change request information to the vehicle control server 2 by the TCU 11.

The battery state detection unit 1600 detects whether the state of the battery mounted on the vehicle 1 is a normal state or an abnormal state. The battery state detection unit 1600 monitors voltage fluctuations of power supplied from the battery of the vehicle 1. For example, the TCU 11 is supplied with power from the battery of the vehicle 1 all the time and therefore, the battery state detection unit 1600 detects that the battery state is an abnormal state when a voltage value of the power supplied to the TCU 11 is a predetermined threshold value or less, and detects that the battery state is a normal state when it is above the predetermined threshold value. In addition, for example, when a voltage value of the power supplied from the battery abruptly (for example, within a predetermined time such as 0.5 seconds) becomes a predetermined threshold value or less, the battery state detection unit 1600 detects that the battery state is an abnormal state and otherwise, detects that the battery state is a normal state. The battery state detection unit 1600 outputs a result of the detection to the notice control unit 1100 and the vehicle start control unit 1300.

Next, the operation of the vehicle control system 3000 in a case where the owner P of the vehicle 1 has not made a loan payment will be described.

Figure 3:
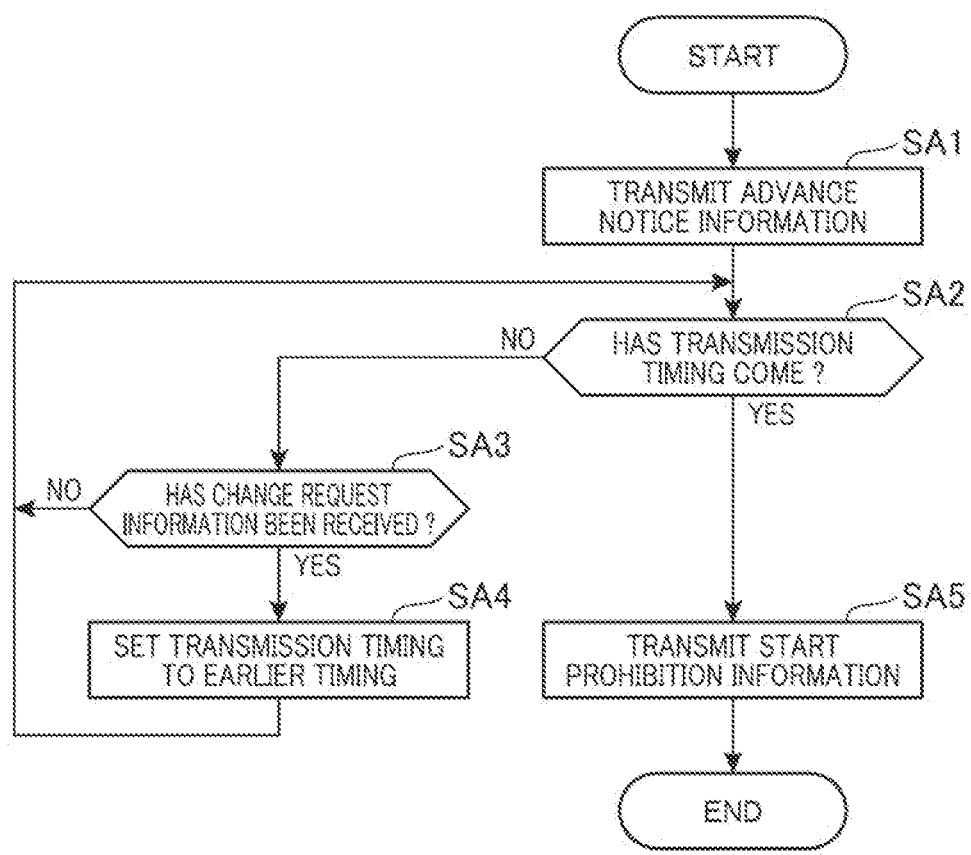
FIG. 3 is a flowchart showing an operation of the vehicle control server.
Figure 4:
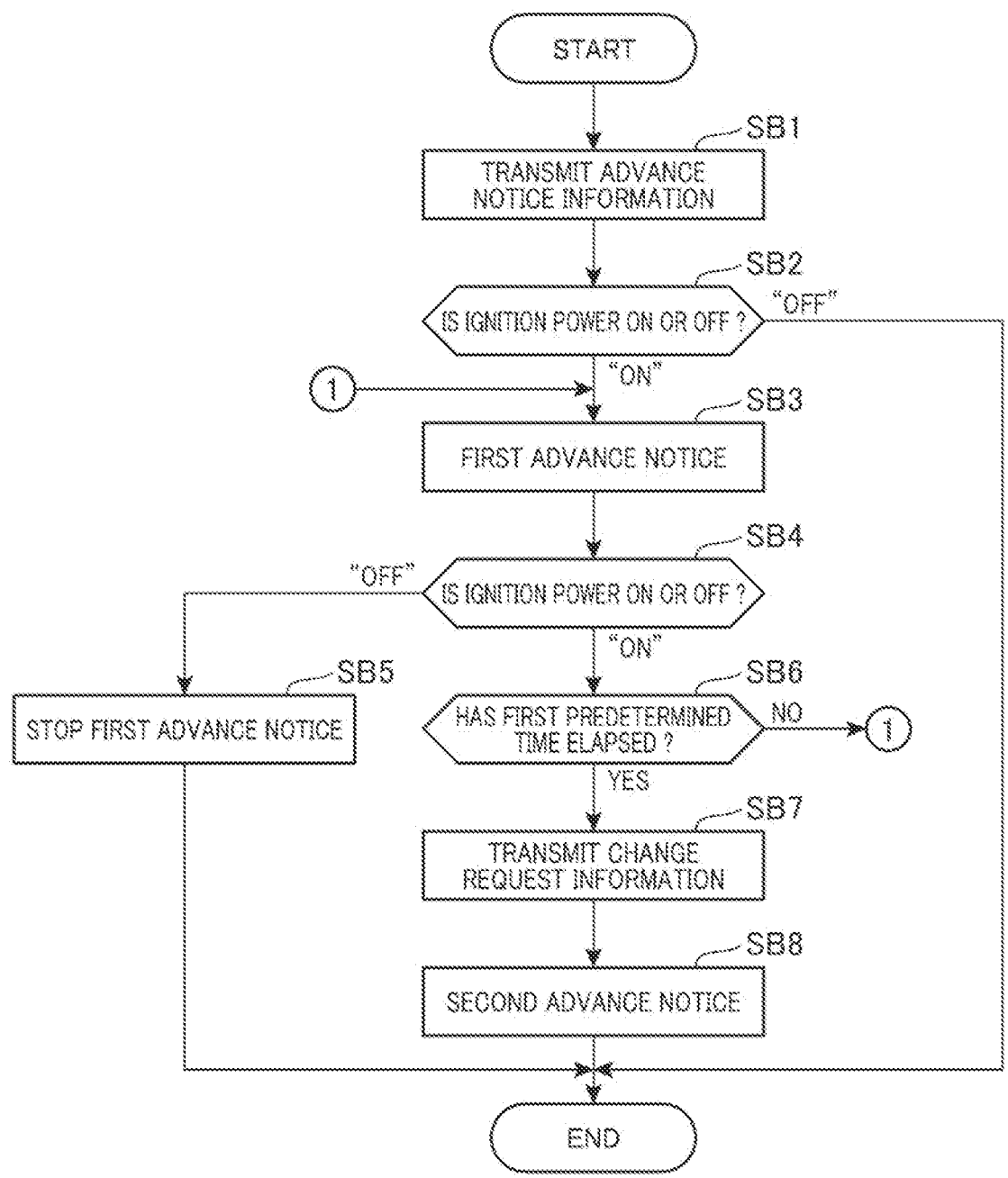
FIG. 4 is a flowchart showing an operation of a vehicle control device.
Figure 5:
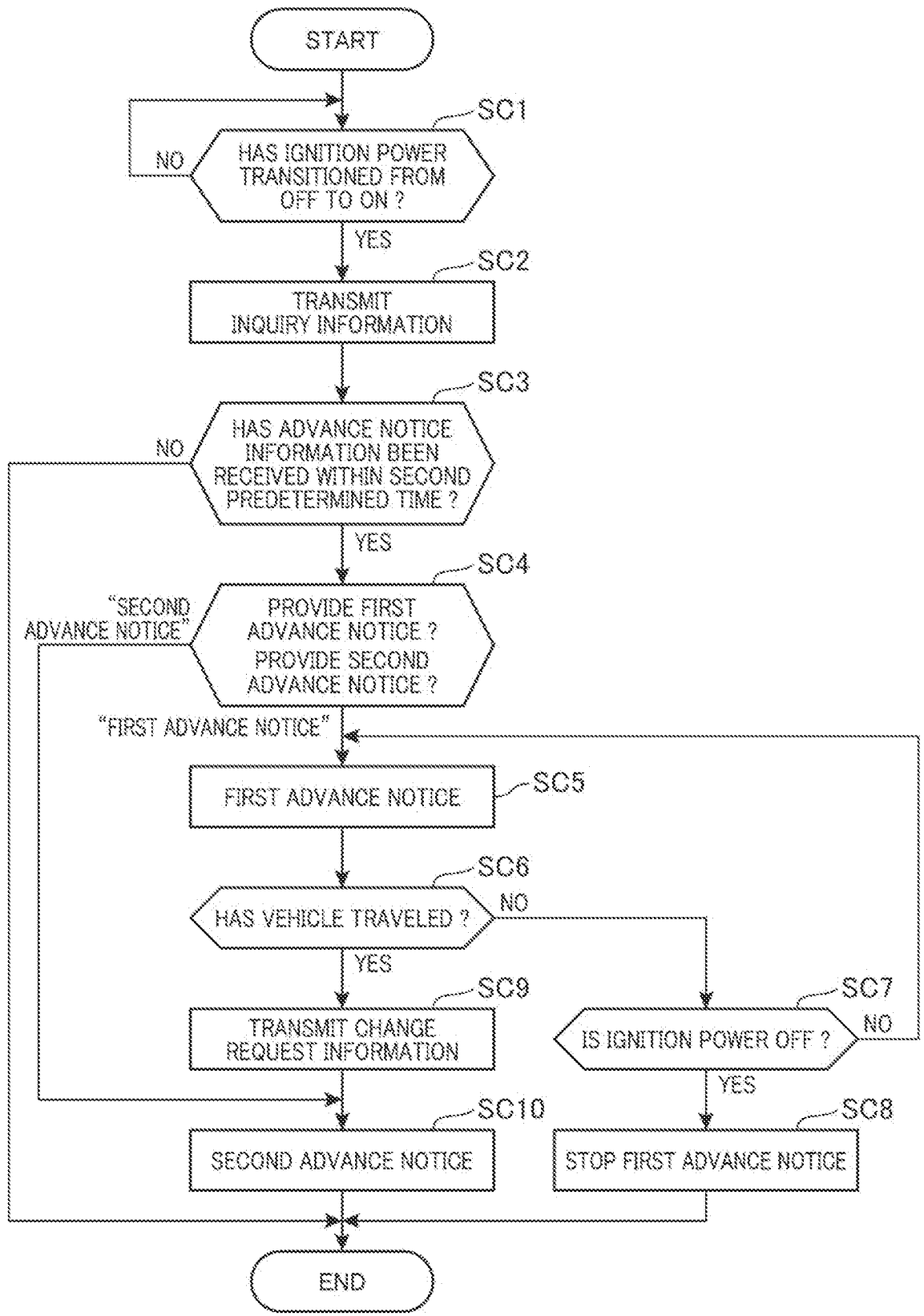
FIG. 5 is a flowchart showing an operation of the vehicle control device.
Figure 6:
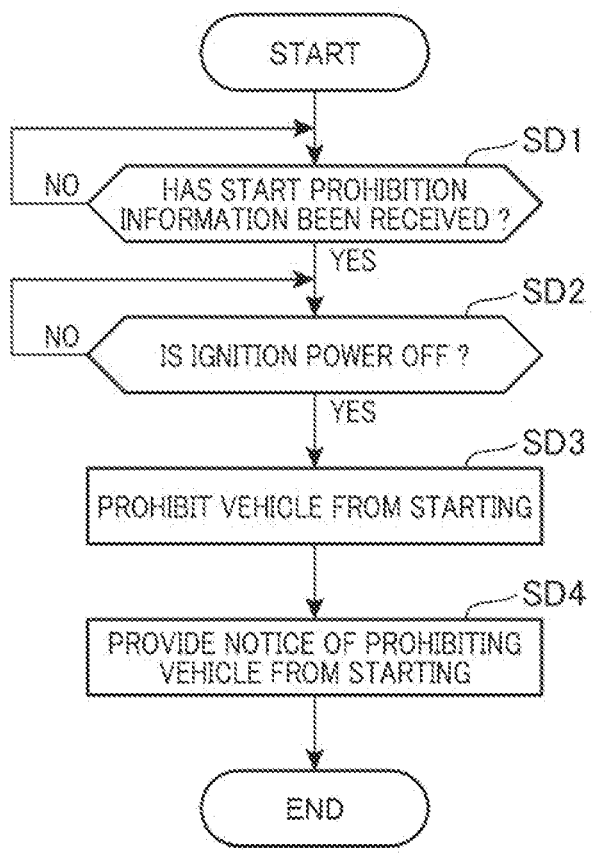
FIG. 6 is a flowchart showing an operation of the vehicle control device.

FIG. 3 is a flowchart showing the operation of the vehicle control server 2. FIG. 4, FIG. 5, and FIG. 6 are flowcharts showing the operation of the vehicle control device 10.

First, the operation of the vehicle control server 2 will be described.

The server communication control unit 2000 of the vehicle control server 2 transmits the advance notice information J2 to the vehicle 1 by the server communication unit 21 (step SA1).

Then, the server communication control unit 2000 determines whether the transmission timing which has been set by the transmission timing setting unit 2100 has come (step SA2).

If the server communication control unit 2000 determines that the transmission timing which has been set by the transmission timing setting unit 2100 has not come (step SA2: NO), it determines whether the change request information has been received from the vehicle 1 (step SA3).

If the server communication control unit 2000 determines that the change request information has not been received from the vehicle 1 (step SA3: NO), it returns processing to step SA2.

If the server communication control unit 2000 determines that the change request information has been received from the vehicle 1 (step SA3: YES), the transmission timing setting unit 2100 sets the transmission timing to an earlier timing than the timing which has been set when the advance notice information J2 has been transmitted (step SA4). In processing of the vehicle control server 2, if processing of step SA4 is complete, processing of step SA2 is performed again.

If the server communication control unit 2000 determines that the transmission timing which has been set by the transmission timing setting unit 2100 has come (step SA2), it transmits the start prohibition information J1 by the server communication unit 21 (step SA5).

Next, the operation of the vehicle control device 10 will be described with reference to FIG. 4, FIG. 5, and FIG. 6.

First, the operation of the vehicle control device 10 in a case of receiving the advance notice information J2 when the ignition power is on, that is, the vehicle 1 is being used will be described with reference to FIG. 4.

When the advance notice information J2 is transmitted from the vehicle control server 2, the vehicle communication control unit 1000 of the vehicle control device 10 receives the advance notice information J2 by the TCU 11 (step SB1).

Then, the notice control unit 1100 determines whether the ignition power is on or off based on a result of detection by the power state detection unit 1200 (step SB2).

If the notice control unit 1100 determines that the ignition power is off (step SB2: "OFF"), it ends this processing.

On the other hand, if the notice control unit 1100 determines that the ignition power is on (step SB2: "ON"), it provides the first advance notice (step SB3). The step SB3 corresponds to a notice control step.

Then, the notice control unit 1100 determines whether the ignition power is on or off based on a result of detection by the power state detection unit 1200 (step SB4).

If the notice control unit 1100 determines that the ignition power is off (step SB4: "OFF"), it stops the first advance notice (step SB5) and ends this processing.

On the other hand, the notice control unit 1100 determines whether a first predetermined time has elapsed after the first advance notice has been provided (step SB6).

If the notice control unit 1100 determines that the first predetermined time has not elapsed after the first advance notice has been provided (step SB6: NO), it returns processing to step SB3 and continues to provide the first advance notice, and also executes processing at and after step SB4.

On the other hand, if the notice control unit 1100 determines that the first predetermined time has elapsed after the first advance notice has been provided (step SB6: YES), the vehicle communication control unit 1000 transmits the change request information generated by the transmission timing change unit 1500 to the vehicle control server 2 (step SB7).

Then, the notice control unit 1100 provides the second advance notice (step SB8) and ends this processing.

Next, the operation of the vehicle control device 10 in a case where the ignition power has transitioned from off to on will be described with reference to FIG. 5.

The notice control unit 1100 of the vehicle control device 10 determines whether the ignition power has transitioned from off to on based on a result of detection by the power state detection unit 1200 (step SC1).

If the notice control unit 1100 determines that the ignition power has not transitioned from off to on, that is, the ignition power remains off (step SC1: NO), it executes processing of step SC1 again.

On the other hand, if the notice control unit 1100 determines that the ignition power has transitioned from off to on (step SC1: YES), the vehicle communication control unit 1000 transmits inquiry information J3 for inquiring whether the advance notice information J2 is to be retransmitted, to the vehicle control server 2 by the TCU 11 (step SC2).

When receiving the inquiry information J3 by the server communication unit 21, the server communication control unit 2000 of the vehicle control server 2 determines whether to retransmit the advance notice information J2 to the vehicle 1 from which the inquiry information J3 has been received. The vehicle control server 2 stores a database that manages whether a loan has been paid for each vehicle 1 that is managed by the vehicle management company CP1. The server communication control unit 2000 refers to the database and if determining that a loan has been paid for the vehicle 1 to which the inquiry information J3 has been transmitted, determines not to retransmit the advance notice information J2 to the vehicle 1. On the other hand, the server communication control unit 2000 refers to the database and if determining that a loan has not been paid for the vehicle 1 to which the inquiry information J3 has been transmitted, determines to retransmit the advance notice information J2 to the vehicle 1. Then, if the server communication control unit 2000 determines to retransmit the advance notice information J2, it retransmits the advance notice information J2 as a response to the inquiry information J3. On the other hand, if the server communication control unit 2000 determines not to retransmit the advance notice information J2, it does not respond to the inquiry information J3.

Returning to description of the flowchart in FIG. 5, the vehicle communication control unit 1000 determines whether it has received the advance notice information J2 within a second predetermined time after transmission of the inquiry information J3 (step SC3).

If the vehicle communication control unit 1000 determines that it has not received the advance notice information J2 within the second predetermined time (step SC3: NO), it ends this processing.

On the other hand, if the vehicle communication control unit 1000 determines that it has received the advance notice information J2 within the second predetermined time (step SC3: YES), the notice control unit 1100 determines whether to provide the first advance notice or to provide the second advance notice (step SC4).

At step SC4, the notice control unit 1100 performs a determination of step SC4 based on a result of the determination of the determination unit 1400, that is, according to whether the determination unit 1400 determines that the vehicle 1 has traveled after the vehicle 1 has received the advance notice information J2. If the determination unit 1400 does not determine that the vehicle 1 has traveled, the notice control unit 1100 determines to provide the first advance notice at step SC4; and if the determination unit 1400 determines that the vehicle 1 has traveled, it determines to provide the second advance notice.

If the notice control unit 1100 determines to provide the first advance notice (step SC4: "FIRST ADVANCE NOTICE"), it provides the first advance notice (step SC5). The step SC5 corresponds to a notice control step.

On the other hand, if the notice control unit 1100 determines to provide the second advance notice (step SC4: "SECOND ADVANCE NOTICE"), it provides the second advance notice (step SC10).

Returning to description for step SC5 and subsequent steps, after the notice control unit 1100 provides the first advance notice, it determines whether the vehicle 1 has traveled after the vehicle 1 has received the advance notice information J1, based on a determination result output by the determination unit 1400 (step SC6).

If the notice control unit 1100 determines that the vehicle 1 has not traveled (step SC6: NO), it determines whether the ignition power has turned off, based on a result of detection by the power state detection unit 1200.

If the notice control unit 1100 determines that the ignition power has been turned off (step SC7: YES), it stops the first advance notice (step SC8) and ends this processing.

On the other hand, if the notice control unit 1100 determines that the ignition power has not been turned off, that is, the ignition power remains on (step SC7: NO), it causes processing to transition to step SC5 and executes processing at and after step SC6 while continuing providing the first advance notice.

Returning to description for step SC6, if the notice control unit 1100 determines that the vehicle 1 has traveled (step SC6: YES), the vehicle communication control unit 1000 transmits the change request information generated by the transmission timing change unit 1500 to the vehicle control server 2 (step SC9).

Then, the notice control unit 1100 provides the second advance notice (step SC10) and ends this processing.

Note that although the operation shown in FIG. 5 is triggered by a transition of the ignition power from off to on, it may be triggered by a transition of the battery state of the vehicle 1 from a normal state to an abnormal state. In this case, at step SC1, the notice control unit 1100 of the vehicle control device 10 determines whether the battery state has transitioned from a normal state to an abnormal state, based on a result of detection by the battery state detection unit 1600. Then, in the processing of the vehicle control device 10, if the notice control unit 1100 determines that the battery state has transitioned from a normal state to an abnormal state, it executes processing at and after step SC2.

Next, the operation of the vehicle control device 10 in a case where the vehicle 1 is prohibited from starting will be described with reference to FIG. 6.

The vehicle communication control unit 1000 of the vehicle control device 10 determines whether the start prohibition information J1 has been received from the vehicle control server 2 by the TCU 11 (step SD1).

If the vehicle communication control unit 1000 determines that the start prohibition information J1 has not been received by the TCU 11 (step SD1), it executes processing of step SD1 again.

On the other hand, if the vehicle communication control unit 1000 determines that the start prohibition information J1 has been received from the vehicle control server 2 (step SD1: YES), the vehicle start control unit 1300 determines whether the ignition power has been turned off, based on a result of detection by the power state detection unit 1200 (step SD2).

If the vehicle start control unit 1300 determines that the ignition power has been turned off (step SD2: YES), it prohibits the vehicle 1 from starting (step SD3). The step SD3 corresponds to a vehicle start control step.

Then, the notice control unit 1100 provides a notice indicating that the vehicle 1 has been prohibited from starting (step SD4).

FIG. 6 shows an operation in which the start of the vehicle 1 is prohibited immediately after the ignition power is turned off. However, for the operation of the vehicle control device 10 for prohibiting the start of the vehicle 1, such a configuration may be adopted that the start of the vehicle 1 is not prohibited before a predetermined time has elapsed (for example, about three to five minutes) after the ignition power has been turned off.

Figure 8:
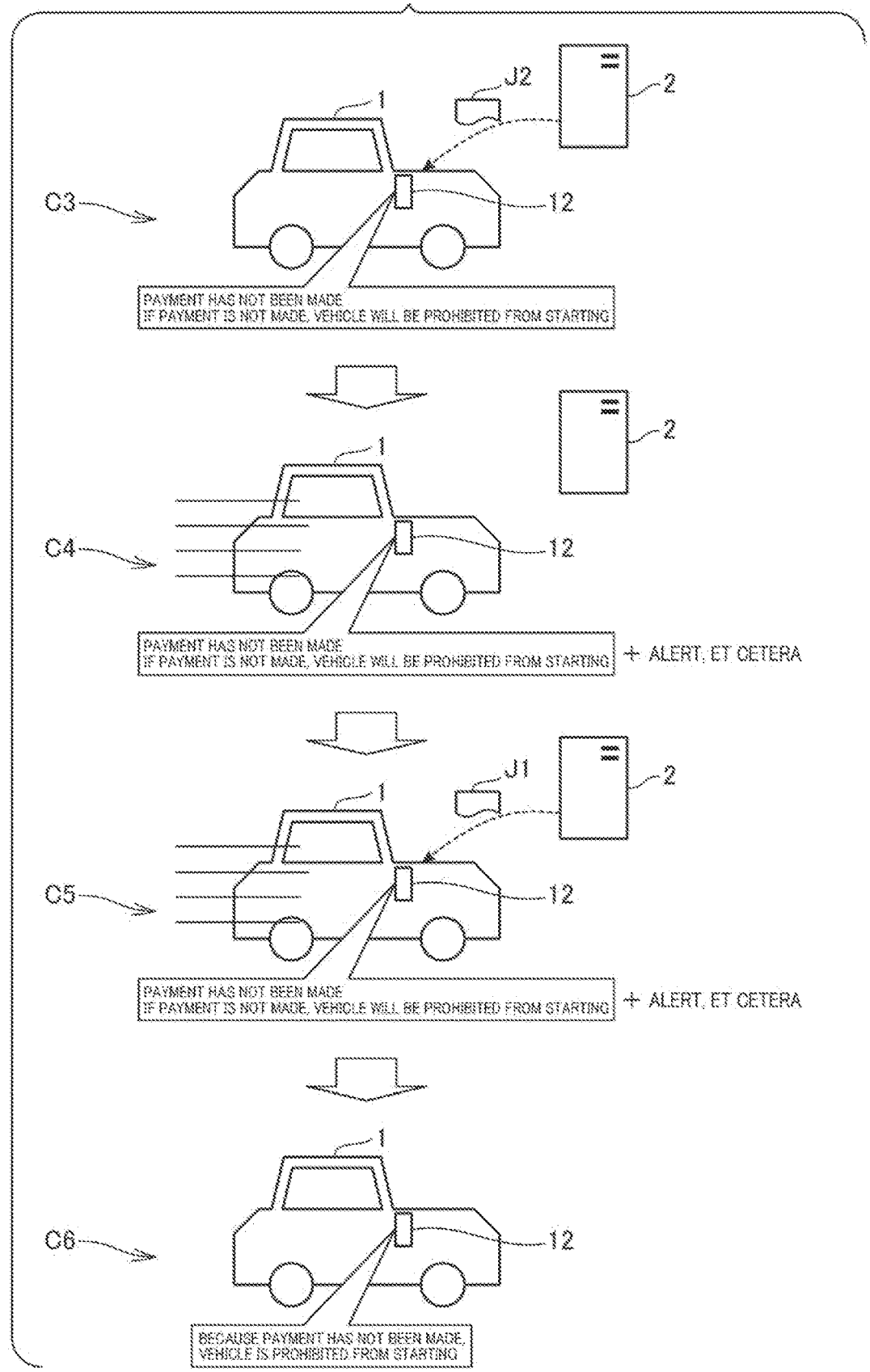
FIG. 8 is a diagram for specifically describing an operation of the vehicle control system.
Figure 9:
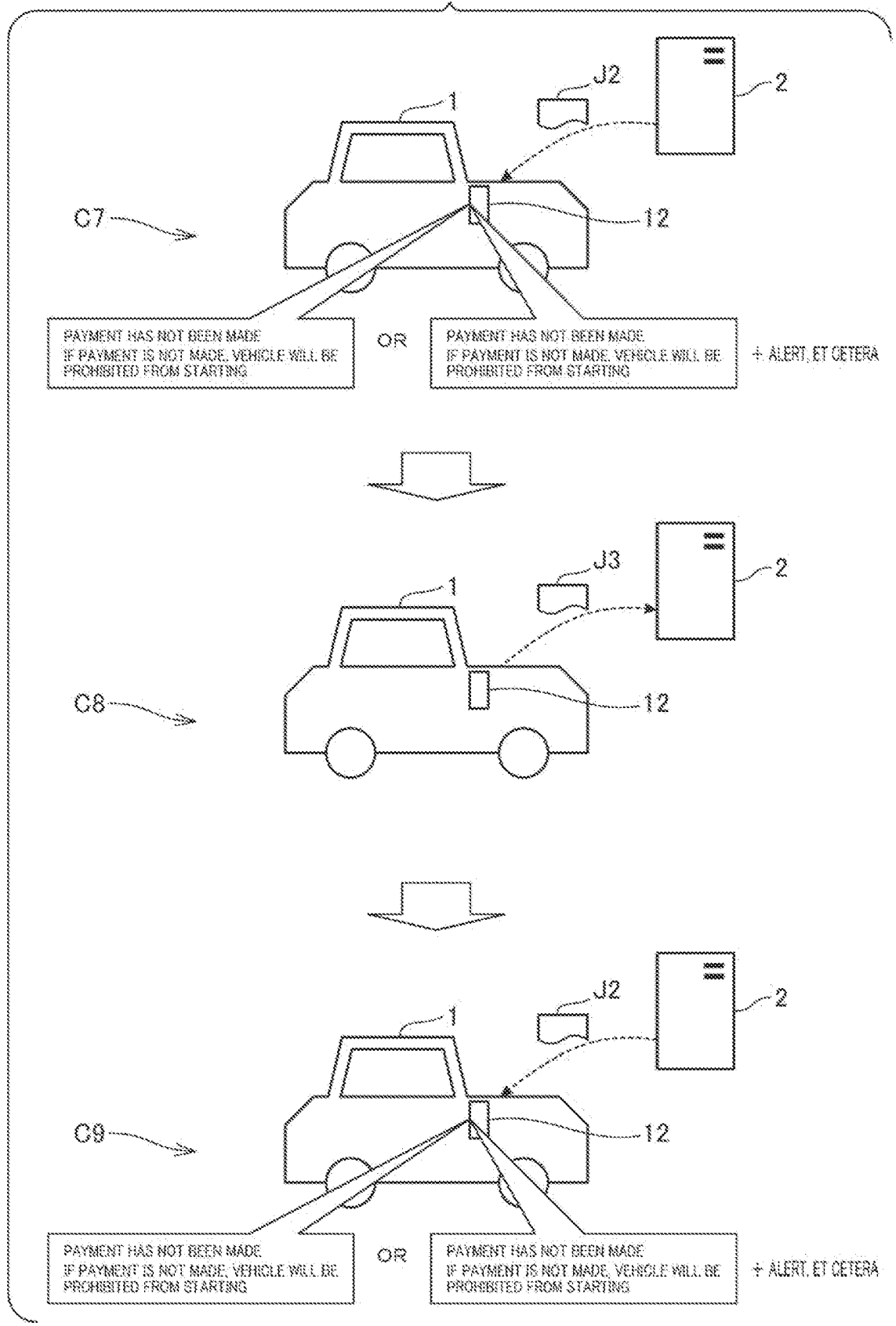
FIG. 9 is a diagram for specifically describing an operation of the vehicle control system.

Next, the above-mentioned operation will be more specifically described by using a plurality of use situation examples of the vehicle 1 in a case where the owner P of the vehicle 1 has not made a loan payment, with reference to FIG. 7 to FIG. 9.

FIG. 7 is a diagram for specifically describing an operation of the vehicle control system 3000.

C1 in FIG. 7 shows a situation in which the vehicle 1 receives the advance notice information J2 from the vehicle control server 2 and the vehicle control device 10 provides the first advance notice.

C2 in FIG. 7 shows a situation in which: the vehicle 1 has not traveled since the situation shown in C1, and the transmission timing has come; the vehicle 1 receives the start prohibition information J1 from the vehicle control server 2; and the vehicle 1 is prohibited from starting. As shown in C2, the meter display device 12 provides a notice indicating that the start of the vehicle 1 is prohibited.

In the situation shown in FIG. 7, the vehicle 1 is prohibited from starting in response to receiving the start prohibition information J1; however, before the vehicle 1 is prohibited from starting, the vehicle control device 10 provides the first advance notice. Thus, in the vehicle control system 3000, a user of the vehicle 1 is allowed to recognize, before the vehicle 1 is prohibited from starting, that the vehicle 1 is going to be prohibited from starting. Therefore, the vehicle control system 3000 can reduce the possibility of causing the start of the vehicle 1 to be prohibited unexpectedly to the user of the vehicle 1. In addition, in the vehicle control system 3000, the owner P of the vehicle 1 is allowed to recognize, before the vehicle 1 is prohibited from starting, that a loan payment has not been made. Therefore, the vehicle control system 3000 can reduce the possibility of causing the start of the vehicle 1 to be prohibited due to having not made a loan payment.

FIG. 8 is a diagram for specifically describing an operation of the vehicle control system 3000.

C3 in FIG. 8 shows a situation in which: the vehicle 1 receives the advance notice information J2 from the vehicle control server 2; and the vehicle control device 10 provides the first advance notice.

C4 in FIG. 8 shows a situation in which: the vehicle 1 has been traveling after the situation shown by C3; and the vehicle control device 10 provides the second advance notice.

C5 in FIG. 8 shows a situation in which: the transmission timing has come after the situation shown by C4; and the vehicle control server 2 transmits the start prohibition information J1 while the vehicle is traveling. As shown in C5, the vehicle control device 10 provides the second advance notice although it has received the start prohibition information J1 from the vehicle control server 2. In addition, the vehicle control device 10 does not prohibit the vehicle 1 from starting although it has received the start prohibition information J1 from the vehicle control server 2.

C6 in FIG. 8 shows a situation in which: the vehicle 1 stops traveling after the situation shown by C5; and the ignition power is turned off. As shown in C6, since the vehicle control device 10 has received the start prohibition information J1 from the vehicle control server 2, it prohibits the vehicle 1 from starting. Furthermore, the vehicle control device 10 provides a notice indicating that the start of the vehicle 1 is prohibited, by using the meter display device 12.

As shown in FIG. 8, the vehicle control device 10 provides the second advance notice when the vehicle 1 travels after the first advance notice. Therefore, even when the user of the vehicle 1 drives the vehicle 1 without being aware of the first advance notice, the user of the vehicle can more surely recognize that the vehicle 1 is going to be prohibited from starting. In addition, since the second advance notice having a stronger stimulus than the first advance notice is provided, the vehicle control system 3000 can make the user of the vehicle 1 recognize that the act of driving the vehicle 1 is an improper act because the loan payment has not been made.

Furthermore, as shown in FIG. 8, the vehicle control device 10 does not prohibit the vehicle 1 from starting while the vehicle 1 is traveling even when receiving the start prohibition information J1 from the vehicle control server 2. Thus, in the vehicle control system 3000, the safety of the vehicle 1 during traveling can be ensured.

FIG. 9 is a diagram for specifically describing an operation of the vehicle control system 3000.

C7 in FIG. 9 shows a situation in which: the vehicle 1 receives the advance notice information J2 from the vehicle control server 2; and the vehicle control device 10 provides the first advance notice or the second advance notice.

C8 in FIG. 9 shows a situation in which: the ignition power of the vehicle 1 is turned on again after the situation shown by C7; and the vehicle control device 10 transmits the inquiry information J3 to the vehicle control server 2.

C9 in FIG. 9 shows a situation in which the vehicle control device 10 receives the advance notice information J2 as a response to the transmitted inquiry information J3 after the situation shown by C8 and provides the first advance notice or the second advance notice.

As shown in FIG. 9, when the ignition power is turned from off to on, the vehicle control device 10 transmits the inquiry information J3 to the vehicle control server 2 and if its response is the advance notice information J2, provides the first advance notice or the second advance notice.

In the vehicle control system 3000, the advance notice information J2 is not stored in the vehicle storage unit 102. This is because if the vehicle 1 is positioned where communication with the vehicle control server 2 is impossible and a loan payment has been made in a configuration in which the advance notice information J2 stored in the vehicle storage unit 102 is read and the first advance notice or the second advance notice is provided, the vehicle control device 10 provides the first advance notice or the second advance notice even though the loan payment has been made. Therefore, it is expected that the user of the vehicle 1 will remove a power line from a battery terminal of the vehicle 1 to stop the first advance notice or the second advance notice. However, when the ignition power is turned from off to on, the vehicle control device 10 transmits the inquiry information J3 to the vehicle control server 2 and therefore, even when the user of the vehicle 1 removes the power line from the battery terminal of the vehicle 1 to stop the first advance notice or the second advance notice, the notice can be provided again.

As described above, the vehicle control system 3000 includes: the vehicle start control unit 1300 that when a predetermined start prohibition condition for the vehicle 1 is established, prohibits the vehicle 1 from starting; and the notice control unit 1100 that before the vehicle 1 is prohibited from starting by the vehicle start control unit 1300, provides the first advance notice that is an advance notice of prohibiting the vehicle 1 from starting, into the cabin of the vehicle 1.

In addition, a vehicle control method executed by the vehicle control unit 100 includes: the vehicle start control step (step SD3) of prohibiting, when a predetermined start prohibition condition for the vehicle 1 is established, the vehicle 1 from starting; and the notice control step (steps SB3, SC5) of providing, before the vehicle 1 is prohibited from starting by the vehicle start control step, the first advance notice that is an advance notice of prohibiting the vehicle 1 from starting, into the cabin of the vehicle 1.

Furthermore, the vehicle control program 102A causes the vehicle control unit 100 to function as: the vehicle start control unit 1300 that prohibits, when a predetermined start prohibition condition for the vehicle 1 is established, the vehicle 1 from starting; and the notice control unit 1100 that provides, before the vehicle 1 is prohibited from starting by the vehicle start control unit 1300, the first advance notice that is an advance notice of prohibiting the vehicle from starting, into the cabin of the vehicle 1.

According to the vehicle control system 3000, the vehicle control method, and the vehicle control program 102A, the user of the vehicle 1 can recognize, before the vehicle 1 is prohibited from starting, that the vehicle 1 is going to be prohibited from starting. Thus, according to the vehicle control system 3000, the vehicle control method, and the vehicle control program 102A, the possibility of causing the start of the vehicle 1 to be prohibited unexpectedly to the user of the vehicle 1 can be reduced.

The vehicle 1 is used by a user based on a loan contract. The start prohibition condition is that a loan payment has not been made.

This configuration allows the user of the vehicle 1 to recognize, before the vehicle 1 is prohibited from starting due to an unpaid loan, that the vehicle 1 is going to be prohibited from starting, thereby reducing the possibility of causing the start of the vehicle 1 to be prohibited unexpectedly to the user of the vehicle 1.

The vehicle control system 3000 includes the power state detection unit 1200 that detects whether the ignition power of the vehicle 1 is on or off. The notice control unit 1100 provides the first advance notice when the power state detection unit 1200 detects that the ignition power of the vehicle 1 is on; and does not provide the first advance notice when the power state detection unit 1200 detects that the ignition power of the vehicle 1 is off.

According to this configuration, the first advance notice is provided only when the ignition power is on, thus allowing power consumption of the vehicle 1 to be reduced while reducing the possibility of causing the start of the vehicle 1 to be prohibited unexpectedly to the user of the vehicle 1.

The notice control unit 1100 provides the first advance notice when receiving from the vehicle control server 2 the advance notice information J2 instructing to provide an advance notice of prohibiting the vehicle 1 from starting. The vehicle control system 3000 includes the vehicle communication control unit 1000 that when the power state detection unit 1200 detects that the ignition power of the vehicle 1 has been turned from off to on, transmits the inquiry information J3 for inquiring whether the advance notice information J2 is to be retransmitted, to the vehicle control server 2 by the TCU 11.

According to this configuration, the inquiry information J3 is transmitted after the ignition power is turned on and therefore, even when the user of the vehicle 1 improperly cancels the notice by an action such as removing the power line from the battery terminal of the vehicle 1, an advance notice of prohibiting the vehicle 1 from starting can be provided again after the action.

The vehicle control system 3000 includes the battery state detection unit 1600 that detects whether the battery state of the vehicle 1 is a normal state or an abnormal state. The notice control unit 1100 provides the first advance notice when receiving from the vehicle control server 2 the advance notice information J2 that instructs to provide an advance notice of prohibiting the vehicle 1 from starting. The vehicle control system 3000 includes the vehicle communication control unit 1000 that when the battery state detection unit 1600 detects that the battery state has transitioned from a normal state to an abnormal state, transmits the inquiry information J3 for inquiring whether the advance notice information J2 is to be retransmitted, to the vehicle control server 2.

According to this configuration, the inquiry information J3 is transmitted after the battery state has turned into an abnormal state and therefore, an advance notice of prohibiting the vehicle 1 from starting can be provided again after, for example, the user of the vehicle 1 improperly cancels the notice by an action such as removing the power line from the battery terminal of the vehicle 1, or the battery capacity becomes a predetermined value or less, that is to say, the battery has run out.

The vehicle control system 3000 includes the determination unit 1400 that determines whether the vehicle 1 has traveled after the notice control unit 1100 has provided the first advance notice. The notice control unit 1100 provides the second advance notice that has a notice mode different from the notice mode of the first advance notice, according to a result of determination by the determination unit 1400.

According to this configuration, an advance notice of prohibiting the vehicle 1 from starting can be provided to a user of the vehicle 1 with the notice mode switched according to whether the vehicle 1 has traveled after the notice control unit 1100 has provided the first advance notice.

The notice control unit 1100 provides the second advance notice when the determination unit 1400 determines that the vehicle 1 has traveled.

According to this configuration, even when the user of the vehicle 1 drives the vehicle 1 without noticing the first advance notice, the user of the vehicle 1 can more surely recognize that the vehicle 1 is going to be prohibited from starting.

The vehicle control system 3000 includes the transmission timing change unit 1500 that after the second advance notice has been provided by the notice control unit 1100, changes the transmission timing to an earlier timing than a timing determined when the notice control unit 1100 provides the first advance notice. For the vehicle start control unit 1300, the server communication unit 21 transmits to the vehicle 1 the start prohibition information J1 at a timing obtained by changing by the transmission timing change unit 1500.

According to this configuration, when the vehicle 1 has traveled even though an advance notice of prohibiting the vehicle 1 from starting has been provided, a timing at which the vehicle 1 is prohibited from starting becomes earlier and therefore, the start of the vehicle 1 that can be improperly used can be prohibited early.

The notice control unit 1100 provides the second advance notice even when the power state detection unit 1200 detects that the ignition power of the vehicle 1 is off.

According to this configuration, the user of the vehicle 1 can more surely recognize that the vehicle 1 is going to be prohibited from starting and therefore, the possibility of causing the start of the vehicle 1 to be prohibited unexpectedly to the user of the vehicle 1 can be further reduced.

Second Embodiment

Next, a second embodiment will be described.

Figure 10:
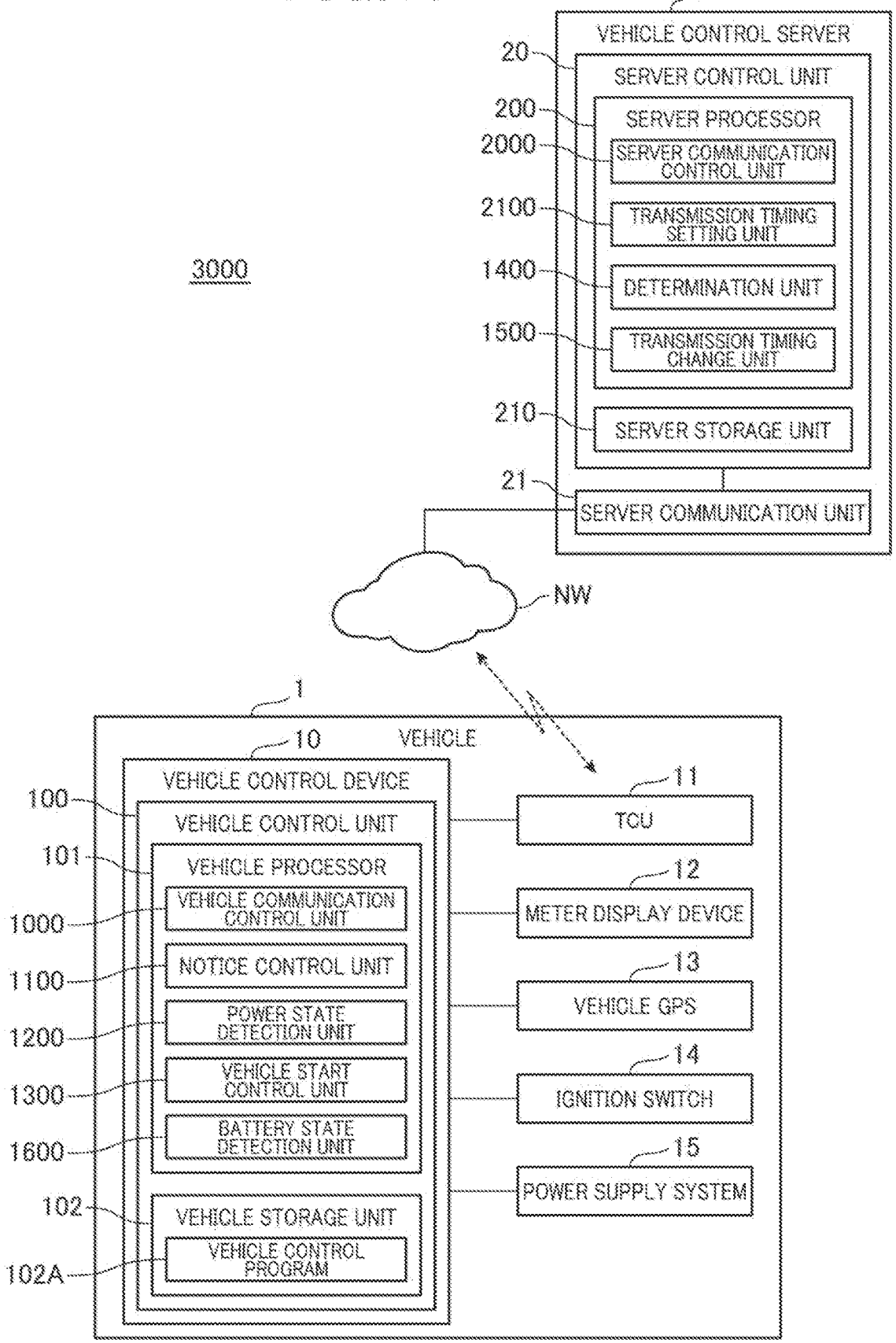
FIG. 10 is a diagram showing configurations of a vehicle control server and a vehicle.

FIG. 10 is a diagram showing the configurations of the vehicle control server 2 and the vehicle 1 that constitute a vehicle control system 3000 of the second embodiment.

In describing the second embodiment, the same components as components of the vehicle control system 3000 of the first embodiment are denoted by the same reference signs and detailed descriptions will be appropriately omitted.

As is clear by comparison with FIG. 2, in the vehicle control system 3000 of the second embodiment, the server processor 200 of the vehicle control server 2 functions as not only the server communication control unit 2000 and the transmission timing setting unit 2100 but also the determination unit 1400 and the transmission timing change unit 1500.

The vehicle communication control unit 1000 of the second embodiment receives the first advance notice information from the vehicle control server 2 and outputs the received first advance notice information to the notice control unit 1100, by the TCU 11.

The first advance notice information is advance notice information J2 that instructs to provide an advance notice of prohibiting the vehicle 1 from starting, by the notice mode of the first advance notice.

In addition, the vehicle communication control unit 1000 of the second embodiment receives the second advance notice information from the vehicle control server 2 and outputs the received second advance notice information to the notice control unit 1100, by the TCU 11.

The second advance notice information is advance notice information J2 that instructs to provide an advance notice of prohibiting the vehicle 1 from starting, by the notice mode of the second advance notice.

Furthermore, the vehicle communication control unit 1000 of the second embodiment obtains from the vehicle GPS 13 the position of the vehicle 1 at a time when the vehicle communication control unit 1000 receives the first advance notice information. The vehicle communication control unit 1000 transmits position data indicating the obtained position of the vehicle 1 to the vehicle control server 2 by the TCU 11. In addition, the vehicle communication control unit 1000 obtains, from the vehicle GPS 13, the position of the vehicle 1 after a predetermined time has elapsed since the acquisition of the position of the vehicle 1 at the time of receiving the first advance notice information. Then, the vehicle communication control unit 1000 transmits the obtained position data indicating the position of the vehicle 1 to the vehicle control server 2 by the TCU 11.

The notice control unit 1100 of the second embodiment provides the first advance notice when the first advance notice information is output from the vehicle communication control unit 1000; and provides the second advance notice when the second advance notice information is output from the vehicle communication control unit 1000.

In addition, the server communication control unit 2000 of the second embodiment transmits the first advance notice information to the vehicle 1 via the network NW. Furthermore, the server communication control unit 2000 transmits the second advance notice information to the vehicle 1 via the network NW. Still furthermore, the server communication control unit 2000 transmits the start prohibition information J1 to the vehicle 1 via the network NW at a timing which has been set by the transmission timing setting unit 2100. When receiving position data from the vehicle 1 via the network NW, the server communication control unit 2000 outputs the position data to the determination unit 1400.

When the server communication control unit 2000 transmits the first advance notice information, the transmission timing setting unit 2100 of the second embodiment sets the transmission timing to a timing after a predetermined time period (for example, one week) has elapsed from the timing at which the first advance notice information has been transmitted. In addition, when change request information is transmitted from the transmission timing change unit 1500, the transmission timing setting unit 2100 sets the transmission timing to a timing that is earlier than the timing which has been set when the first advance notice information has been transmitted.

The determination unit 1400 of the second embodiment determines, as with the first embodiment, whether the vehicle 1 has traveled after the first advance notice information has been transmitted to the vehicle 1, based on the position data which has been output from the server communication control unit 2000. The determination unit 1400 outputs a result of the determination to the server communication control unit 2000 and the transmission timing change unit 1500.

When the determination result which is output by the determination unit 1400 indicates that the vehicle 1 has traveled, the transmission timing change unit 1500 of the second embodiment generates change request information that requests a change of the transmission timing to an earlier timing than the timing which has been set when the first advance notice information has been transmitted. Then, the transmission timing change unit 1500 outputs the generated change request information to the transmission timing setting unit 2100.

Next, the operation of the vehicle control system 3000 of the second embodiment in a case where the owner P of the vehicle 1 has not made a loan payment will be described.

Figure 11:
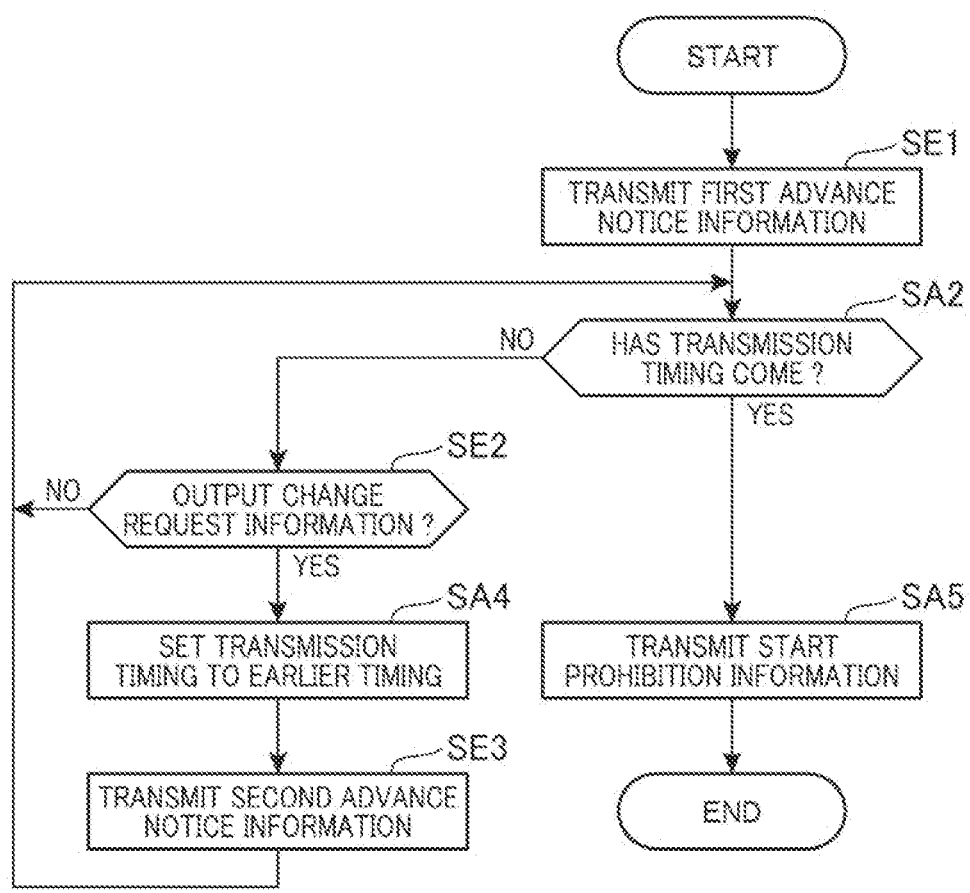
FIG. 11 is a flowchart showing an operation of the vehicle control server.
Figure 12:
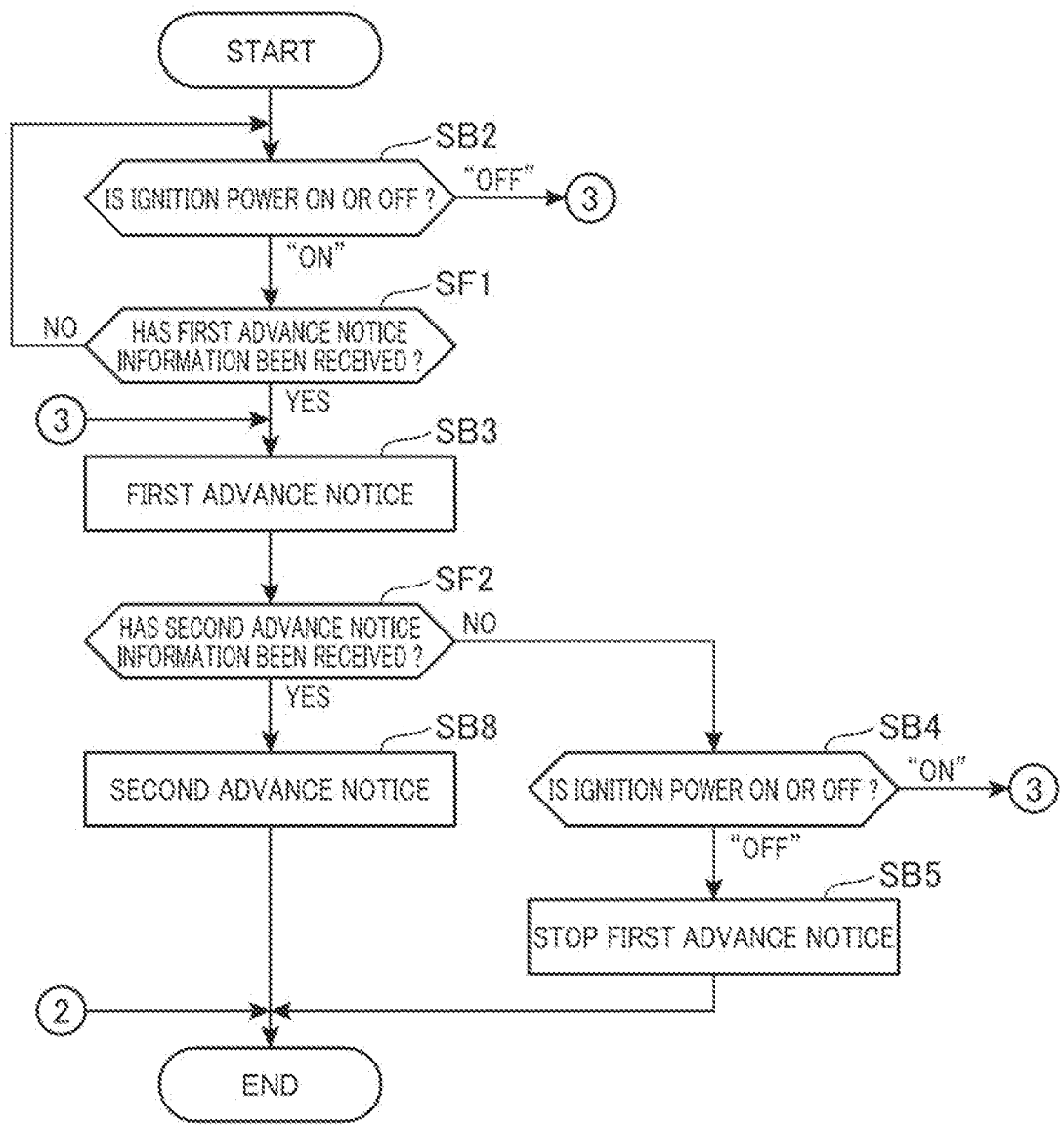
FIG. 12 is a flowchart showing an operation of a vehicle control device.
Figure 13:
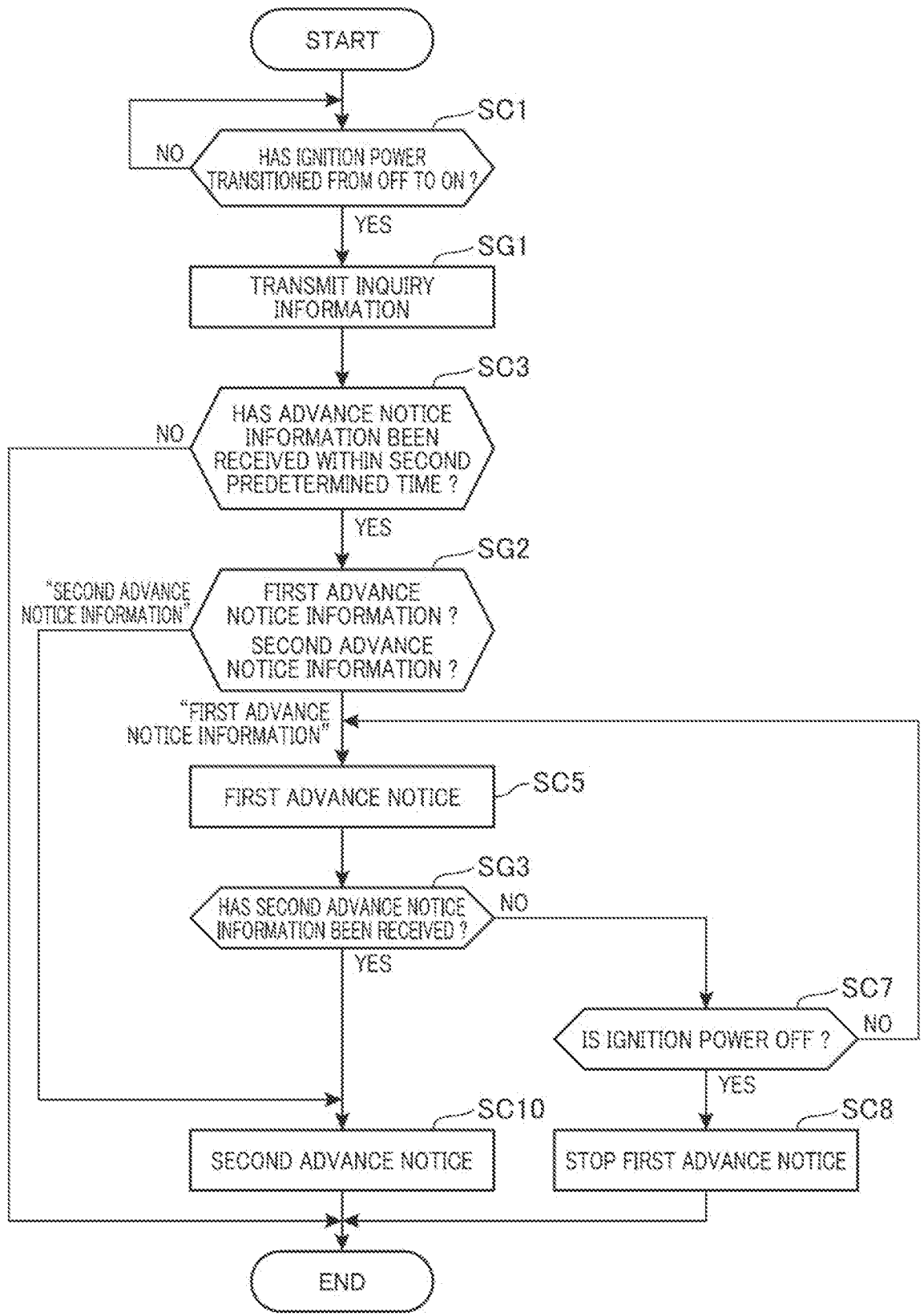
FIG. 13 is a flowchart showing an operation of the vehicle control device.

FIG. 11 is a flowchart showing the operation of the vehicle control server 2. FIG. 12 and FIG. 13 are flowcharts showing the operation of the vehicle control device 10.

In the flowchart shown in FIG. 11, the same steps of the flowchart as those shown in FIG. 3 are denoted by the same step numbers and their detailed descriptions will be omitted. In addition, in the flowchart shown in FIG. 12, the same steps as those of the flowchart shown in FIG. 4 are denoted by the same step numbers and their detailed descriptions will be omitted. Furthermore, in the flowchart shown in FIG. 13, the same steps as those of the flowchart shown in FIG. 5 are denoted by the same step numbers and their detailed descriptions will be omitted.

First, the operation of the vehicle control server 2 will be described with reference to FIG. 11.

The server communication control unit 2000 transmits the first advance notice information to the vehicle 1 by the server communication unit 21 (step SE1).

If the server communication control unit 2000 determines that the transmission timing which has been set by the transmission timing setting unit 2100 has not come (step SA2: NO), it determines whether the change request information has been output from the transmission timing change unit 1500 (step SE2).

If the server communication control unit 2000 determines that the change request information has not been output from the transmission timing change unit 1500 (step SE2: NO), it returns processing to step SA2.

If the server communication control unit 2000 determines that the change request information has been output from the transmission timing change unit 1500 (step SE2: YES), the transmission timing setting unit 2100 sets the transmission timing to an earlier timing than the timing which has been set when the advance notice information J2 has been transmitted (step SA4).

Next, the server communication control unit 2000 transmits the second advance notice information to the vehicle 1 by the server communication unit 21 (step SE3).

Next, the operation of the vehicle control device 10 of the second embodiment in a case where the ignition power is on, that is, the vehicle 1 is being used will be described with reference to FIG. 12.

If the notice control unit 1100 determines that the ignition power is on (step SB2: "ON"), it determines whether the first advance notice information has been received by the TCU 11 (step SF1).

If the notice control unit 1100 determines that the first advance notice information has not been received by the TCU 11 (step SF1: NO), it returns processing to step SB2.

On the other hand, if the notice control unit 1100 determines that the first advance notice information has been received by the TCU 11 (step SF1: YES), it provides the first advance notice (step SB3).

Next, the notice control unit 1100 determines whether the second advance notice information has been received by the TCU 11 (step SF2).

If the notice control unit 1100 determines that second advance notice information has not been received by the TCU 11 (step SF2: NO), it executes processing at and after step SB4. At step SB4, if the notice control unit 1100 determines that the ignition power is on (step SB4: "ON"), it causes the processing to transition to step SB3.

On the other hand, if the notice control unit 1100 determines that the second advance notice information has been received by the TCU 11 (step SF2: YES), it provides the second advance notice (step SB8) and ends this processing.

Next, the operation of the vehicle control device 10 of the second embodiment in a case where the ignition power has transitioned from off to on will be described with reference to FIG. 13.

If the notice control unit 1100 of the vehicle control device 10 determines that the ignition power has transitioned from off to on (step SC1: YES), the vehicle communication control unit 1000 transmits inquiry information J3 for inquiring whether the advance notice information J2 of the first advance notice information or the second advance notice information is to be retransmitted, to the vehicle control server 2 by the TCU (step SG1).

When the server communication control unit 2000 of the vehicle control server 2 receives the inquiry information J3 by the server communication unit 21, it determines whether to retransmit the advance notice information J2 to the vehicle 1 from which the inquiry information J3 has been received. The determination is performed in a manner described in the first embodiment. If the server communication control unit 2000 determines not to retransmit the advance notice information J2, it does not respond to the inquiry information J3. On the other hand, if the server communication control unit 2000 determines to retransmit the advance notice information J2, it determines whether the second advance notice information has been transmitted to the vehicle 1 that has transmitted the inquiry information J3. If the server communication control unit 2000 determines that the second advance notice information has been transmitted, it transmits the second advance notice information as a response to the inquiry information J3. On the other hand, if the server communication control unit 2000 determines that the second advance notice information has not been transmitted, it transmits the first advance notice information as a response to the inquiry information J3.

Returning to description of the flowchart in FIG. 13, the vehicle communication control unit 1000 determines whether the advance notice information J2 has been received within a second predetermined time after transmission of the inquiry information J3 (step SC3).

On the other hand, if the vehicle communication control unit 1000 determines that the advance notice information J2 has been received within the second predetermined time (step SC3: YES), the notice control unit 1100 determines whether the received advance notice information J2 is the first advance notice or the second advance notice (step SG2).

If the notice control unit 1100 determines that it is the first advance notice information (step SG2: "FIRST ADVANCE NOTICE INFORMATION"), it provides the first advance notice (step SC5).

On the other hand, if the notice control unit 1100 determines that it is the second advance notice information (step SG2: "SECOND ADVANCE NOTICE INFORMATION"), it provides the second advance notice (step SC10).

Returning to description for step SC5 and subsequent steps, after the notice control unit 1100 provides the first advance notice, it determines whether the second advance notice information has been received from the vehicle control server 2 by the TCU 11 (step SG3).

If the notice control unit 1100 determines that second advance notice information has not been received (step SG3: NO), it executes processing at and after step SC7.

On the other hand, if the notice control unit 1100 determines that the second advance notice information has been received (step SG3: YES), it provides the second advance notice (step SC10) and ends this processing.

Note that although the operation shown in FIG. 13 is triggered by a transition of the ignition power from off to on, it may be triggered by a transition of the battery state of the vehicle 1 from a normal state to an abnormal state. In this case, at step SC1, the notice control unit 1100 of the vehicle control device 10 determines whether the battery state has transitioned from a normal state to an abnormal state, based on a result of detection by the battery state detection unit 1600. Then, in the processing of the vehicle control device 10, if the notice control unit 1100 determines that the battery state has transitioned from a normal state to an abnormal state, it executes processing at and after step SG1.

According to the second embodiment, even when the server processor 200 functions as not only the server communication control unit 2000 and the transmission timing setting unit 2100 but also the determination unit 1400 and the transmission timing change unit 1500, the same effect as that of the first embodiment is obtained.

Note that the present invention is not limited to the configurations of the above embodiments and can be implemented in various aspects without departing from the gist thereof.

For example, in the above embodiments, the vehicle control unit 100 functions as the vehicle start control unit 1300 and the notice control unit 1100. However, the server control unit 20 may function as the vehicle start control unit 1300 and the notice control unit 1100. In this case, the server storage unit 210 stores the vehicle control program 102A. In addition, in this case, the vehicle start control unit 1300 transmits an instruction to prohibit the vehicle from starting, to the vehicle control device 10. Furthermore, the notice control unit 1100 transmits an instruction to cause the vehicle control device 10 to provide the first advance notice and the second advance notice. In this case, the server control unit 20 corresponds to a computer according to the present invention.

For example, in the above embodiments, when a loan payment has not been made for the vehicle 1 which has been purchased with a loan, the vehicle control server 2 transmits the advance notice information J2 and the start prohibition information J1. However, the vehicle 1 to which the vehicle control server 2 transmits the advance notice information J2 and the start prohibition information J1 is not limited to the vehicle 1 which has been purchased with a loan. For example, the vehicle 1 to which the vehicle control server 2 transmits the advance notice information J2 and the start prohibition information J1 may be a vehicle 1 which has been rented from an owner P of the vehicle 1 by a person who has concluded a rental contract with the owner P of the vehicle 1. The rental contract corresponds to a usage contract in the present invention. In this case, if the person who has rented the vehicle 1 has not paid its rental fee, the vehicle control server 2 transmits the advance notice information J2 and the start prohibition information J1. A failure to pay the rental fee corresponds to a failure to fulfill the usage contract in the present invention.

In addition, for example, in the above embodiments, the first advance notice and the second advance notice are provided when a failure to fulfill the contract due to a delay in loan payment or the like occurs; however, provision of the first advance notice and the second advance notice may be performed also in a case where a vehicle is rented by the hour through car sharing, car rental, or the like. In this case, when a rental end time has passed, the first advance notice is provided; after a predetermined time has passed (for example, 30 minutes to one hour), the second advance notice is provided; and in the end, starting is prohibited. The content of the first advance notice in this case is, for example, "The vehicle rental time has ended. For excess time, a relevant extra fee will be charged.", "The vehicle rental time has ended. Please contact the management company (management store).", or the like. In addition, the content of the second advance notice is, for example, "Return the vehicle immediately.", "Contact the management company (management store) immediately.", or the like.

For example, in the above embodiments, the determination unit 1400 determines whether the vehicle 1 has traveled based on the positions of the vehicle 1; however, the determination unit 1400 may determine whether the vehicle 1 has traveled in consideration of elements other than the positions of the vehicle 1 or based on elements other than the positions of the vehicle 1. For example, the determination unit 1400 may take into consideration whether tires have rotated, whether power consumption has changed, or the like.

For example, the vehicle 1 may be a vehicle capable of manual driving which travels by a driver performing an operation related to driving or may be a vehicle capable of automatic driving which automatically travels without a driver performing an operation related to driving. In addition, the vehicle 1 may be, for example, an engine-driven four-wheel vehicle, a motor-driven electric vehicle, or a motor and engine mounted hybrid vehicle. Note that the vehicle 1 may be a vehicle other than a four-wheel vehicle.

For example, in the above embodiment, the blocks shown in FIG. 2 and FIG. 10 are schematic diagrams showing components by classification according to main processing contents for easy understanding of the invention of the present application and the components may be classified into further subcomponents according to processing contents. In addition, classification may be made so that one component executes further more processing.

For example, the step units of the operations shown in FIG. 3, FIG. 4, FIG. 5, FIG. 6, FIG. 11, FIG. 12, and FIG. 13 are obtained by division according to main processing contents for easy understanding of the operation of the vehicle control system 3000 and the present invention is not limited by the manner of division into processing units and by names. Further division into more step units may be made according to processing contents. In addition, division may be made so that one step unit includes further more processing. Furthermore, the order of steps may be appropriately changed without departing from the spirit of the present invention.

REFERENCE SIGNS LIST 1 vehicle, 2 vehicle control server (server), 100 vehicle control unit (computer), 102A vehicle control program, 20 server control unit (computer), 1000 vehicle communication control unit (transmission control unit), 1100 notice control unit, 1200 power state detection unit, 1400 determination unit, 1500 transmission timing change unit (timing transmission unit), 1600 battery state detection unit, 3000 vehicle control system, J1 start prohibition information, J2 advance notice information, J3 inquiry information

What is claimed is:

1. A vehicle control system, comprising a processor and memory, wherein the processor includes:
    a vehicle start control unit configured to prohibit a vehicle from starting when a predetermined start prohibition condition for the vehicle is established;
    a notice control unit configured to provide a first advance notice into a cabin of the vehicle before the vehicle is prohibited from starting by the vehicle start control unit, the first advance notice being an advance notice of prohibiting the vehicle from starting; and
    a determination unit configured to determine whether the vehicle has traveled after the notice control unit has provided the first advance notice, wherein
    the processor stores in the memory a timing, at which the vehicle start control unit prohibits the vehicle from starting, that is determined when the first advance notice is provided,
    the notice control unit is configured to provide a second advance notice into the cabin of the vehicle according to a result of determination by the determination unit, the second advance notice being an advance notice of prohibiting the vehicle from starting, the second advance notice having a notice mode different from a notice mode of the first advance notice, and
    the processor further includes a timing change unit configured to change a timing at which the vehicle start control unit prohibits the vehicle from starting after the notice control unit has provided the second advance notice, the timing being changed to an earlier timing than the timing stored.

2. The vehicle control system according to claim 1, wherein
    the vehicle is used by a user under a predetermined usage contract; and
    the start prohibition condition is the user's failure to fulfill the usage contract.

3. The vehicle control system according to claim 1, wherein the vehicle comprises a vehicle processor,
    the vehicle processor includes a power state detection unit configured to detect whether an ignition power of the vehicle is on or off;
    wherein the notice control unit is configured to:
        provide the first advance notice when the power state detection unit detects that the ignition power of the vehicle is on; and
        not provide the first advance notice when the power state detection unit detects that the ignition power of the vehicle is off.

4. The vehicle control system according to claim 3, wherein
    the notice control unit is configured to provide the first advance notice when receiving advance notice information from a server, the advance notice information instructing to provide an advance notice of prohibiting the vehicle from starting; and
    the vehicle processor includes a transmission control unit configured to transmit inquiry information to the server when the power state detection unit detects that the ignition power of the vehicle has turned from off to on, the inquiry information being for inquiring whether the advance notice information is to be retransmitted.

5. The vehicle control system according to claim 1, wherein the vehicle comprises a vehicle processor,
    the vehicle processor includes a battery state detection unit configured to detect whether a battery state of the vehicle is a normal state or an abnormal state;
    wherein the notice control unit is configured to provide the first advance notice when receiving advance notice information from a server, the advance notice information instructing to provide an advance notice of prohibiting the vehicle from starting; and
    the vehicle processor further includes a transmission control unit configured to transmit inquiry information to the server as a function of the battery state detection unit detecting that the battery state has transitioned from a normal state to an abnormal state, the inquiry information being for inquiring whether the advance notice information is to be retransmitted.

6. The vehicle control system according to claim 1, wherein
    the notice control unit is configured to provide the second advance notice when the determination unit determines that the vehicle has traveled.

7. The vehicle control system according to claim 1, wherein the vehicle comprises a vehicle processor,
    the vehicle processor includes a power state detection unit configured to detect whether an ignition power of the vehicle is on or off;

wherein the notice control unit is configured to provide a second advance notice even when the power state detection unit detects that the ignition power of the vehicle is off.

8. A vehicle control method executed by a computer, the method comprising:
   a vehicle start control step of prohibiting a vehicle from starting when a predetermined start prohibition condition for the vehicle is established;
   a notice control step of providing a first advance notice into a cabin of the vehicle before the vehicle is prohibited from starting by the vehicle start control step, the first advance notice being an advance notice of prohibiting the vehicle from starting; and
   a step of determining whether the vehicle has traveled after the notice control step has provided the first advance notice, wherein
   a timing, at which the vehicle start control step prohibits the vehicle from starting, that is determined when the first advance notice is provided is stored in a memory,
   the notice control step provides a second advance notice into the cabin of the vehicle according to a result of determination by the step of determining, the second advance notice being an advance notice of prohibiting the vehicle from starting, the second advance notice having a notice mode different from a notice mode of the first advance notice, and
   the vehicle control method further comprises a step of changing a timing at which the vehicle start control step prohibits the vehicle from starting after the notice control step has provided the second advance notice, the timing being changed to an earlier timing than the timing stored.

9. A non-transitory computer-readable storage medium storing a vehicle control program causing a computer to function as:
   a vehicle start control unit that prohibits a vehicle from starting when a predetermined start prohibition condition for the vehicle is established;
   a notice control unit that provides a first advance notice into a cabin of the vehicle before the vehicle is prohibited from starting by the vehicle start control unit, the first advance notice being an advance notice of prohibiting the vehicle from starting; and
   a determination unit configured to determine whether the vehicle has traveled after the notice control unit has provided the first advance notice, wherein
   a timing, at which the vehicle start control unit prohibits the vehicle from starting, that is determined when the first advance notice is provided is stored in a memory,
   the notice control unit is configured to provide a second advance notice into the cabin of the vehicle according to a result of determination by the determination unit, the second advance notice being an advance notice of prohibiting the vehicle from starting, the second advance notice having a notice mode different from a notice mode of the first advance notice, and
   the computer further functions as a timing change unit configured to change a timing at which the vehicle start control unit prohibits the vehicle from starting after the notice control unit has provided the second advance notice, the timing being changed to an earlier timing than the timing stored.

* * * * *